US00RE37896E

(19) United States
(12) Reissued Patent
Tomida et al.

(10) Patent Number: US RE37,896 E
(45) Date of Reissued Patent: Oct. 29, 2002

(54) SOLUTION FOR FABRICATION OF ELECTRON-EMITTING DEVICES, MANUFACTURE METHOD OF ELECTRON-EMITTING DEVICES, AND MANUFACTURE METHOD OF IMAGE-FORMING APPARATUS

(75) Inventors: Yoshinori Tomida, Atsugi (JP); Hiroyuki Hashimoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/456,302

(22) Filed: Dec. 8, 1999

Related U.S. Patent Documents

Reissue of:
(64) Patent No.: 5,716,618
Issued: Feb. 10, 1998
Appl. No.: 08/508,678
Filed: Jul. 28, 1995

(30) Foreign Application Priority Data

| | | |
|---|---|---|
| Aug. 11, 1994 | (JP) | 6-209375 |
| Aug. 11, 1994 | (JP) | 6-209379 |
| Apr. 4, 1995 | (JP) | 7-101614 |
| Apr. 4, 1995 | (JP) | 7-101615 |

(51) Int. Cl.[7] ..... B05D 5/12

(52) U.S. Cl. ..... 427/126.1; 427/126.5; 427/126.6; 427/77; 427/126.1; 427/126.3; 427/226; 556/49; 556/136; 556/138

(58) Field of Search ..... 427/126.1, 126.3, 427/226, 126.5, 126.6, 77; 556/49, 136, 138

(56) References Cited

U.S. PATENT DOCUMENTS 4,431,686 A * 2/1984 Bewer et al. ..... 427/226

(List continued on next page.)

FOREIGN PATENT DOCUMENTS

| | | |
|---|---|---|
| EP | 0 391 314 | * 10/1990 |
| EP | 0 484 808 | * 5/1992 |
| EP | 0 605 881 | * 7/1994 |
| JP | 6-203740 | 7/1994 |

OTHER PUBLICATIONS

"Field Emission" by W.P. Dyke et al., Advances in Electronics and Electron Physics: vol. VIII, 1956, Academic Press Inc.; pp. 89–185.*

(List continued on next page.)

*Primary Examiner*—Shrive P. Beck
*Assistant Examiner*—Michael Cleveland
(74) *Attorney, Agent, or Firm*—Fitzpatrick, Cella, Harper & Scinto

(57) ABSTRACT

In a solution for forming electron-emitting regions of electron-emitting devices, the solution contains a metal carboxylate expressed by the following general formula (I), an organic solvent [and/or], *and* water;

$$(R(COO)_k)_m M \qquad (I)$$

where k=[numeral from] 1 [to 4], m=*a* numeral from 1 to 4, and [$R=C_nX_{2n+1-k}$] $R=C_nX_{2n+2-k}$ where X=*a* hydrogen or halogen [(total number of hydrogen and halogen atoms is 2n+1)], n=*an* integer from 0 to 30, and M=*a* metal, *wherein the organic solvent is a carboxylic ester having the same carboxylic group as* $R(COO)_k$ *expressed in the general formula* (*I*). In a manufacture method of electron-emitting devices each provided between electrodes with a conductive film including an electron-emitting region, a process of forming the conductive film includes a step of coating and calcining the above solution. An image-forming apparatus is manufactured by using the electron-emitting devices. Variations in sheet resistance values of electron-emitting region-forming thin films and characteristics of the electron-emitting devices are reduced.

10 Claims, 17 Drawing Sheets

U.S. PATENT DOCUMENTS

| | | | | | |
|---|---|---|---|---|---|
| 5,066,883 | A | * | 11/1991 | Yoshioka et al. | 313/309 |
| 5,149,854 | A | * | 9/1992 | Nappier | 556/136 |
| 5,210,245 | A | * | 5/1993 | Nappier | 556/114 |
| 5,514,822 | A | * | 5/1996 | Scott et al. | 556/28 |
| 5,612,082 | A | * | 3/1997 | Azuma et al. | 427/96 |
| 5,622,634 | A | * | 4/1997 | Noma et al. | 216/40 |

OTHER PUBLICATIONS

"Operation of Tunnel–Emission Devices" by C.A. Mead; Journal of Applied Physics; vol. 32, No. 4, Apr. 1961, pp. 645–652.*

"Physical properties of thin–film field emission cathodes with molybdenum cones" C.A. Spindt et al.; Journal of Applied Physics; vol. 47, No. 12, Dec. 1976; pp. 5248–5263.*

"Electrical Conduction and Electron Emission of Discontinuous Thin Film" by G. Dittmer; Thin Solid Films 9 (1972) pp. 317–328.*

"Electroforming and Electron Emission of Carbon Thin Films" by H. Araki et al. Journal of the Vacuum Society of Japan; vol. 26, No. 1, pp. 22–29.*

"The Emission of Hot Electrons and The Field Emission of Electrons From Tin Oxide" by M.I. Elinson et al.; Radio Engineering and Electronic Physics; Jul. 1965 pp. 1290–1296.*

"Strong Electron Emission From Patterned Tin–Indium Oxide Thin Films" by M. Hartwell et al.; Int'l . Electron Devices Meeting, 1975, Washington D.C.; pp. 519–521.*

"Ueber stereoisomere Butantetracarbonsauren" by K. Auser et al.; Berichte der Deutschen Chemischen Gesellschaft; 1894; pp. 1114–1132.*

* cited by examiner

SOLUTION FOR FABRICATION OF ELECTRON-EMITTING DEVICES, MANUFACTURE METHOD OF ELECTRON-EMITTING DEVICES, AND MANUFACTURE METHOD OF IMAGE-FORMING APPARATUS

Matter enclosed in heavy brackets [ ] appears in the original patent but forms no part of this reissue specification; matter printed in italics indicates the additions made by reissue.

*This application is a reissue of Ser. No. 08/508,768, filed Jul. 28, 1995, which issued as U.S. Pat. No. 5,716,618.*

BACKGROUND OF THE INVENTION

1. Field of the Invention

The present invention relates to a solution for fabrication of electron-emitting devices which is used to form electron-emitting regions of the electron-emitting devices, and manufacture methods of electron-emitting devices, electron sources, and image-forming apparatus based on the use of the solution.

2. Related Background Art

There are hitherto known two types of electron-emitting devices; i.e., thermionic cathode devices and cold cathode devices. Cold cathode devices include the field emission type (hereinafter abbreviated to FE), the metal/insulating layer/metal type (hereinafter abbreviated to MIM), the surface conduction type, etc.

Examples of FE electron-emitting devices are described in, e.g., W. P. Dyke & W. W. Doran, "Field emission", Advance in Electron Physics, 8, 89 (1956) and C. A. Spindt, "Physical properties of thin-film field emission cathodes with molybdenum cones", J. Appl. Phys., 47, 5248 (1976).

One example of MIM electron-emitting devices is described in, e.g., C. A. Mead, "Operation of Tunnel-Emission Devices", J. Appl. Phys., 32, 646 (1961).

One example of surface conduction electron-emitting devices is described in, e.g., M. I. Elinson, Radio Eng. Electron Phys., 10, 1290, (1965).

Surface conduction electron-emitting devices operate based on such a phenomenon that when a thin film of small area is formed on a base plate and a current is supplied to flow parallel to the film surface, electrons are emitted therefrom.

As to such surface conduction electron-emitting devices, there have been reported, for example, one using a thin film of $SnO_2$ by Elinson cited above, one using an Au thin film [G. Dittmer: Thin Solid Films, 9, 317 (1972)], one using a thin film of $In_2O_3/SnO_2$ [M. Hartwell and C. G. Fonstad: "IEEE Trans. ED Conf.", 519 (1975)], and one using a carbon thin film [Hisashi Araki et. al.: Vacuum, Vol. 26, No. 1, 22 (1983)].

As a typical configuration of those surface conduction electron-emitting devices, FIG. 17 schematically shows the device configuration proposed by M. Hartwell, et. al. in the above-cited paper.

In FIG. 17, denoted by reference numeral 1 is a base plate. 2 is an electron-emitting region-forming thin film formed of a metal oxide thin film made by sputtering into an H-shaped pattern. An electron-emitting region 3 is formed by energization treatment called Forming (described later).

Denoted by 4 is an electron-emitting region-containing thin film. Incidentally, the device length L1 defined as shown is about 0.5 mm to 1 mm and the device width W is about 0.1 mm.

In those surface conduction electron-emitting devices, it has heretofore been customary that, before starting the emission of electrons, the thin film 2 is subjected to an energization treatment called Forming to form the electron-emitting region 3.

The term "Forming" means treatment of applying a voltage across the electron-emitting region-forming thin film 2 to locally destroy, deform or denature it to thereby form the electron-emitting region 3 which has been transformed into an electrically high-resistance state.

The electron-emitting region 3 may be formed as a gap or gaps produced in part of the electron-emitting region-forming thin film 2. In this case, electrons are emitted from the vicinity of the gap.

The electron-emitting region-forming thin film containing the electron-emitting region produced by the Forming will hereinafter be referred to as an electron-emitting region-containing thin film 4.

The surface conduction electron-emitting device after being subjected to the Forming treatment emits electrons from the electron-emitting region 3 when a voltage is applied to the electron-emitting region-containing thin film 4 such that a current flows through the device surface.

The electron-emitting region-forming thin film 2 is formed by coating and drying a solution of an organic metal compound, heating and calcining the coated film for removal of an organic compound by thermal decomposition, and then producing a metal or metal oxide thin film. The coated film of the organic metal compound tends to have a relatively large crystal structure so that crystal patterns and boundary lines of the crystal patterns produced during the coating still remain after the step of heating and calcining. This results in a problem of unevenness in the film thickness and the resistance value.

Of organic metal compounds, particularly amines or ammine complexes of metal carboxylates tend to much sublimate and their films are thinned during the step of heating and calcining due to sublimation. This raises a problem that electrical resistances of the thinned films are not uniform and, hence, characteristics of devices in a lot are not uniform. It is also desired that, in each device, a resistance value of the electron-emitting region-forming thin film 2 be even between opposed electrodes.

SUMMARY OF THE INVENTION

An object of the present invention is to provide an organic metal compound capable of solving the problem of unevenness in film thickness experienced in the prior art, and also to provide an electron-emitting region-forming thin film from which an electron-emitting region can be formed by the conventional energization treatment called Forming.

The present invention employs an organic metal compound which is not crystallized during a step of coating.

The organic metal compound is preferably not melted during a step of heating and calcining.

Also, the organic metal compound is preferably not sublimated during a step of heating and calcining.

According to one aspect of the present invention, there is provided a solution (for fabrication of electron-emitting devices) for forming electron-emitting regions of electron-emitting devices, wherein the solution contains a metal carboxylate expressed by the following general formula (I), an organic solvent and/or water;

$$(R(COO)_k)_mM \quad (I)$$

where k=*a* numeral from 1 to 4, m=*a* numeral from 1 to 4, and [$R=C_nX_{2n+1-k}$] $R=C_nX_{2n+2-k}$ where X=*a* hydrogen or halogen [(total number of hydrogen and halogen atoms is 2n+1)], n=integer from 0 to 30, and M=metal, *provided that when n is 0, k is 1 or 2*.

According to another aspect of the present invention, there is provided a manufacture method of electron-emitting devices each provided between electrodes with a conductive film including an electron-emitting region, wherein a process of forming the conductive film in which the electron-emitting region is to be formed includes a step of coating and calcining a solution which contains a metal carboxylate expressed by the following general formula (I), an organic solvent and/or water;

$$(R(COO)_k)_mM \quad (I)$$

where k=*a* numeral from 1 to 4, m=*a* numeral from 1 to 4, and [$R=C_nX_{2n+1-k}$] $R=C_nX_{2n+2-k}$ where X=*a* hydrogen or halogen [(total number of hydrogen and halogen atoms is 2n+1)], n=integer from 0 to 30, and M=metal, *provided that when n is 0, k is 1 or 2*.

According to further aspects of the present invention, there are provided electron-emitting devices produced by the above manufacture method, an electron source in which the electron-emitting devices in plural number are arrayed, an image-forming apparatus including the electron source, and a manufacture method of the image-forming apparatus.

DESCRIPTION OF THE PREFERRED EMBODIMENTS

Figure 1A:
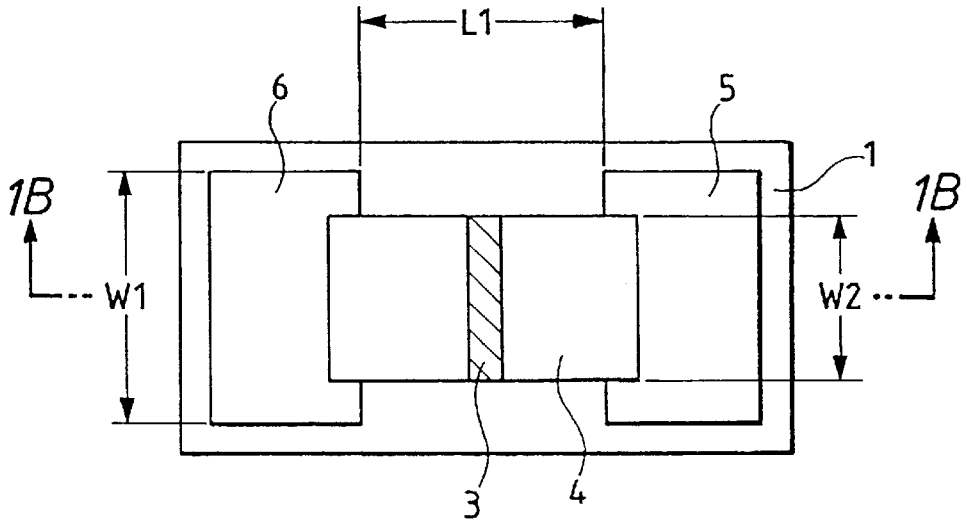
FIGS. 1A and 1B are a schematic plan and a sectional view, respectively, showing the basic structure of a surface conduction electron-emitting device of the present invention.

A first feature of the present invention resides in a solution for fabrication of electron-emitting devices, wherein a metal carboxylate is dissolved as an organic metal compound in an organic solvent and/or water.

The term "solution for fabrication of electron-emitting devices" used herein means a solution for forming electron-emitting region-forming thin films of surface condition electron-emitting devices each including an electron-emitting region between opposed electrodes. The present invention provides a solution for fabrication of electron-emitting devices, wherein a metal carboxylate expressed by the following general formula (I) is dissolved in an organic solvent and/or water;

$$(R(COO)_k)_mM \quad (I)$$

where k=*a* numeral from 1 to 4, m=*a* numeral from 1 to 4, and [$R=C_nX_{2n+1-k}$] $R=C_nX_{2n+2-k}$ where X=*a* hydrogen or halogen [(total number of hydrogen and halogen atoms is 2n+1)], n=integer from 0 to 30, and M=metal, *provided that when n is 0, k is 1 or 2*.

Further, a step of heating and calcining the metal carboxylate is carried out by setting the temperature and time enough to decompose 90% or more of the organic component while supplying gas such as oxygen or nitrogen, if necessary. With this step, 90% or more of the metal carboxylate is transformed into an inorganic metal and/or an inorganic metal compound such as inorganic metal oxide or inorganic metal nitride, for formation of the electron-emitting region-forming thin film.

Metals usable as the metal carboxylate are ones capable of easily emitting electrons upon application of a voltage, i.e., those ones which have a relatively low value of work function and are stable, and include, e.g., Pd, Ru, Ag, Au, Ti, In, Cu, Cr, Fe, Zn, Sn, Ta, W, Pb, Tl, Hg, Cd, Pt, Mn, Sc, Y, La, Co, Ce, Zr, Th, V, Mo, Ni, Os, Rh and Ir.

The organic component is a carboxylic acid expressed by a general formula $R(COO)_k$.

Practical examples of $R(COO)_k$ with $R=C_nX_{2n+2-k}$ *and* k=1 usable in the general formula (I) are a formic acid, an acetic acid, a propionic acid, a butyric acid, an isobutylic acid, and a valeric acid.

Practical examples of $R(COO)_k$ with $R=C_nX_{2n+2-k}$ *and* k=2 are a succinic acid, a malonic acid, and an adipic acid.

A practical example of $R(COO)_k$ with $R=C_nX_{2n+2-k}$ *and* k=3 is a propane-1,2,3-tricarboxylic acid.

[Reference: V. Lippmann, Ber., 12, 1650 (1879)]

A practical example of $R(COO)_k$ with $R=C_nX_{2n+2-k}$ *and* k=4 is a butane-1,2,3,4-tetracarboxylic acid.

[Reference: W. Bertram, Ber., 36, 329 (1903)]

[Reference: K. Auwers, A. Jacob, Ber., 27, 1126 (1894)]

The organic metal compound is any of metallic salts of those carboxylic acids (metal carboxylates), but the number of carboxylic acids coupled to one metal changes from 1 to 4 depending on valence values of metal ions.

It is well known, for example, that in the case of silver, silver acetate generally consists of an acetic acid in one equivalent and silver in one equivalent and in the case of palladium, palladium acetate generally consists of an acetic acid in two equivalents and palladium in one equivalent.

It is also well known that yttrium (Y) forms a triacetate and lead (Pb) forms a tetraacetate.

When the metal carboxylate consists of polycarboxylic ions with k=2 or more and metal ions having two or more valence values, for example, when a malonic acid (ions) having k=2 and palladium (ions) are coupled together, palladium in one equivalent couples to a malonic acid in one equivalent as expressed by $(CH_2(COO)_2)Pd$. Also, the molecule formula represents just an apparent ratio, and two carboxylic groups of a malonic acid are not always coupled to the same palladium atom. In other words, one carboxylic group of each of two malonic acids adjacent to each other may be coupled to one palladium atom as expressed by:

$$[—OOCCH_2COO—Pd—OOCCH_2COO—]$$

In the case of a propane-1,2,3-tricarboxylic acid (ions) having k=3 and palladium (ions), there produces $(OOCCH_2CH(COO)CH_2COO)_{2/3}Pd$. Thus, m is not always integer with respect to a metal in one equivalent.

The metal carboxylate explained above generally decomposes under heat at low temperatures and, therefore, can simply be transformed into an inorganic metal and/or an inorganic metal compound by calcining it in an ordinary heating/calcining furnace. The reason is presumably that a carboxylic acid is coupled to a metal with a low degree of ionicity. Some of halides and salts of inorganic acids containing no organic components have melting/boiling/sublimating temperatures and decomposing temperatures of about 1000° C. that is much higher than heat-resisting temperatures of glasses or silicon wafers generally used as base plates for the electron-emitting devices, electrode materials, etc.

The above-described metal carboxylate is prepared as a solution capable of coating. While a solvent depends on the number of carbon atoms in the carboxylic acid or the kind of metal used in the metal carboxylate, water or an organic solvent can be used. For those metallic salts of carboxylic acids having the number of carbon atoms as low as 2 to 4, such as an acetic acid, in which metals belong to Group IV of the Periodic Table beginning with potassium, water can be used as a solvent because they are usually water soluble.

For other metallic salts, or when water is not preferable as a solvent because of low volatility, an organic solvent can be used.

A second feature of the present invention resides in that carboxylic ester is particularly preferable as the organic solvent. The reason is that although organic metal compounds generally have a high degree of crystallinity, a coated thin film of a carboxylic ester solution of the metal carboxylate expressed by the above general formula (I) has no crystallinity as found by the inventors from a result of X-ray diffraction. Practical examples of the carboxylic ester include methyl acetate, ethyl acetate, butyl acetate, and ethyl propionate.

A third feature of the present invention resides in that a carboxylic group of the carboxylic ester is common to $R(COO)_k$ expressed in the general formula (I).

Specifically, even if such carboxylic ester remains in the coated film, it decomposes under heat at the same time as the metal carboxylate expressed by the general formula (I) during the process of thermal decomposition and, hence, it is burnt completely up. Also, the coated film is free from defects due to low-temperature boiling of the solvent remained in the coated film. In other words, the carboxylic ester will neither impair thermal decomposition of the metal carboxylate expressed by the general formula (I), nor accelerate the thermal decomposition. As a result, a uniform electron-emitting region-forming thin film can be obtained.

A practical example of the carboxylic ester satisfying the above condition is a diethyl malonate solution of palladium malonate expressed by $(CH_2(COO)_2)Pd$ as cited above.

A fourth feature of the present invention resides in that a carboxylic group of the carboxylic ester is different in R from that in the general formula (I). As the number of carbon atoms contained in the carboxylic acid increases, the boiling point of the carboxylic ester is so raised that the carboxylic ester may remain in the coated film after coating using a spinner and exhibit fluidity. In such a case, therefore, it is preferable to use carboxylic ester having different R.

For example, ethyl butylate (boiling point: 120° C.) is used for Pd stearate (cf. boiling point of ethyl stearate: 224° C.).

A fifth feature of the present invention resides in that methane polyhalide, ethane polyhalide or ethylene polyhalide is used as the organic solvent. Practical examples of such hydrocarbon halides are dichloromethane, chloroform carbon tetrachloride, 1,2-dichloroethane, and trans-dichloroethylene. Some of solutions prepared by dissolving the metal carboxylates expressed by the general formula (I) in those solvents are problematic in that coated films of the solutions have crystallinity, but are advantageous in having very high solubility.

The above-described metal carboxylate is prepared as a solution of appropriate concentration, and the solution is coated on a base plate by spinning or the like and then subjected to thermal decomposition, thereby forming an electron-emitting region-forming thin film which has resistance suitable for the energization Forming. To form the electron-emitting region-forming thin film having suitable resistance, it is desired that the concentration of the metal carboxylate solution be held within an appropriate range.

Thus, a sixth feature of the present invention resides in that the content of the metal carboxylate expressed by the general formula (I) is in the range of 0.1 wt % to 10 wt %.

If the content is in the range of 0.1 wt % to 10 wt %, the electron-emitting region-forming thin film can be formed to have resistance suitable for the energization Forming by coating the solution plural times or repeating the steps of coating and calcining plural times, or under an extreme coating condition where the rotational speed of a spinner is set to a very low or high value.

As a general manufacture method of a thin film, however, it is impractical to repetitively coat a solution by spinning several hundreds times, and it is customary to repeat coating as many as ten times at maximum. Also, setting the rotational speed of a spinner to a very low or high value is not desired because of unevenness of the coated film.

Therefore, the content of the metal carboxylate in the coating solution is more preferably in the range of 1 wt % to 5 wt % to satisfy such requirements that coating is repeated as many as ten times at maximum, the solution is coated under an ordinary condition, and the electron-emitting region-forming thin film has resistance suitable for the energization Forming.

But, since a bulk resistance value of the coated film changes depending on a metallic material represented by M in the general formula (I), the content of the metal carboxylate is appropriately set case by case, taking into account the structural formula of the material. By way of example, the proper concentration of the coating solution depends on the molecular weight of a carboxylic acid as well, because the content of the metal is relatively reduced as the molecular weight of a carboxylic acid increases.

A seventh feature of the present invention resides in adding a carboxylic acid having a carboxylic group, which is common to or different in R from $R(COO)_k$ expressed in the general formula (I), in 1 to 1/100 equivalent with respect to the metal carboxylate expressed in the general formula (I). While, as mentioned above, the coated film tends to exhibit high crystallinity when methane polyhalide, ethane polyhalide or ethylene polyhalide is used as the organic solvent, adding the above carboxylic acid, as an additive, to such polyhalide is effective to reduce the crystallinity.

An organic metal compound is generally insulating and electrical treatment called Forming, described later, could not be performed if the organic metal compound is left as it is after coating. Therefore, the organic metal compound is heated and calcined for transformation into a metal and/or an inorganic metal compound. In this respect, it is required to transform 90% or more of the organic metal compound into an inorganic metal and/or an inorganic metal compound such as inorganic metal oxide or inorganic metal nitride by setting the temperature and time enough to decompose 90% or more of the organic component during the step of heating and calcining, while supplying gas such as oxygen or nitrogen, if necessary. The reason why 90% or more of the organic component must be decomposed is that, if the range is satisfied, the electrical resistance is so reduced as to enable the Forming treatment. The remaining part (the component not larger than 10%) consists of $H_2O$, CO, $NO_x$, etc., but depending on the kind of metal, it is impossible to completely remove them by adsorption, occlusion and/or orientation thereof. Those residues are preferably not present.

It is also preferable that the metal or the inorganic metal compound obtained after the step of heating and calcining be a thin film in the form of dispersed fine particles, as described later.

An eighth feature of the present invention resides in a manufacture method of electron-emitting devices by using, as a material, the organic metal compound having at least one of the above first to seventh features.

A ninth feature of the present invention resides in an image-forming apparatus wherein an electron source is made up of the electron-emitting devices and an image is formed by electrons emitted from the electron source and irradiating upon a fluorescent film or the like.

The basic structure of surface conduction electron-emitting devices suitable for use in the present invention is divided into plane type and step type.

The plane type surface conduction electron-emitting device will first be described.

Figure 1B:
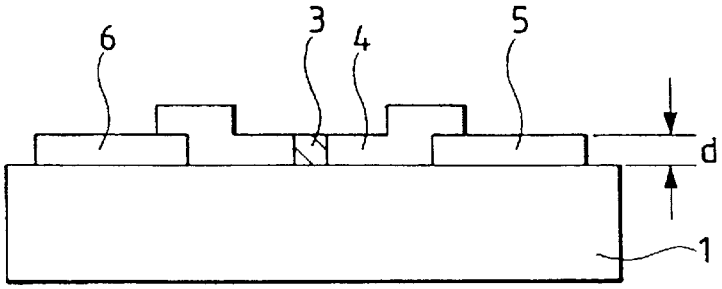

FIGS. 1A and 1B are a schematic plan and a sectional view, respectively, showing the basic structure of a plane type surface conduction electron-emitting device suitable for use in the present invention. The basic structure of the electron-emitting device suitable for use in the present invention will be explained below with reference to FIGS. 1A and 1B.

In FIGS. 1A and 1B, denoted by 1 is a base plate, 5 and 6 are device electrodes, 4 is a conductive thin film, and 3 is an electron-emitting region.

The base plate 1 may be made of any of various glasses such as quartz glass, glass containing an impurity such as Na in reduced content, soda lime glass, and glass having $SiO_2$ laminated on soda lime glass by sputtering, or ceramics such as alumina.

The device electrodes 5, 6 opposed to each other can be made of any of usual conductive materials. By way of example, a material for the device electrodes may be selected from metals such as Ni, Cr, Au, Mo, W, Pt, Ti, Al, Cu and Pd or alloys thereof, printing conductors comprising metals such as Pd, Ag, Au, $RuO_2$ and Pd-Ag or oxides thereof, glass and so on, transparent conductors such as $In_2O_3$—$SnO_2$, and semiconductors such as polysilicon.

The spacing L1 between the device electrodes, the length W1 of each device electrode, and the shape and the width W2 of the conductive thin film 4 are designed in view of the form of application and other conditions.

The spacing L1 between the device electrodes is preferably in the range of several hundreds angstroms to several hundreds microns, more preferably in the range of several microns to several tens microns, taking into account the voltage applied between the device electrodes, and so on.

Depending on a resistance value between the device electrodes 5, 6 and characteristics of electron emission, the length W1 of the device electrodes is preferably in the range of several microns to several hundreds microns and the thickness d of the device electrodes is preferably in the range of several hundreds angstroms to several microns.

In addition to the structure shown in FIGS. 1A and 1B, the surface conduction electron-emitting device may also be formed by laminating the conductive thin film 4 and the device electrodes 5, 6 opposed to each other on the base plate 1 successively.

In order to provide good characteristics of electron emission, it is particularly preferable that the conductive thin film 4 be formed of a fine particle film comprising fine particles. The thickness of the conductive thin film 4 is appropriately set in consideration of step coverage to the device electrodes 5, 6, a resistance value between the device electrodes 5, 6, conditions of the energization Forming (described later), and so on. The film thickness is preferably in the range of several angstroms to several thousands angstroms, more preferably in the range of 10 to 500 angstroms. Also, the conductive thin film 4 has a sheet resistance value in the range of $1\times10^3$ to $1\times10^7$ Ω/□.

Practical examples of a material used to form the conductive thin film 4 include metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, and carbon.

The term "fine particle film" used herein means a film comprising a number of fine particles aggregated together and having such a microstructure that individual fine particles are dispersed away from each other, or adjacent to each other, or overlapped with each other (including an island pattern). The size of the fine particles is in the range of several angstroms to several thousands angstroms, preferably in the range of 10 to 200 angstroms.

The electron-emitting region 3 may include a high-resistance gap developed in part of the conductive thin film 4, and is formed depending on the thickness, properties and material of the conductive thin film 4, the manner of the energization Forming, and so on. Also, conductive fine particles having a size in the range of several angstroms to several hundreds angstroms may be contained in the electron-emitting region 3. The conductive fine particles are made up by part or all of elements constituting a material of the conductive thin film 4. The electron-emitting region 3 and the conductive thin film 4 in the vicinity thereof may contain carbon or carbon compounds in some cases.

A step type surface conduction electron-emitting device, which is also suitable for use in the present invention, but has a different structure from the above, will now be described.

Figure 6:
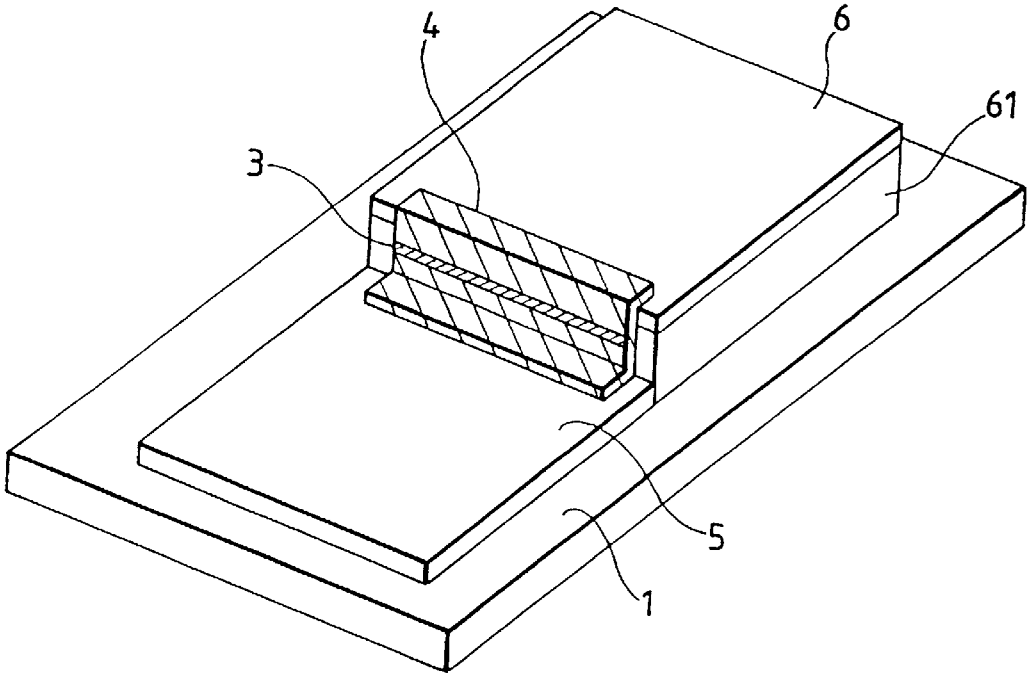
FIG. 6 is a schematic view showing the basic structure of a step type surface conduction electron-emitting device suitable for use in the present invention.

FIG. 6 is a schematic view showing the basic structure of a plane type surface conduction electron-emitting device suitable for use in the present invention.

In FIG. 6, the same components as those in FIGS. 1A and 1B are denoted by the same reference numerals. Denoted by 61 is a step-forming section.

A base plate 1, device electrodes 5 and 6, a conductive thin film 4, and an electron-emitting region 3 can be made of similar materials as used in the plane type surface conduction electron-emitting device explained above. The step forming section 61 is formed of, e.g., an electrically insulating material such as $SiO_2$ by any suitable process of vacuum evaporation, printing, sputtering or the like. The thickness of the step forming section 61 corresponds to the spacing L1 between the device electrodes in the plane type surface conduction electron-emitting device explained above and, hence, it is in the range of several hundreds angstroms to several tens microns. While the thickness of a film used to form the step-forming section 61 is set in consideration of the manufacture process of the step forming section and the voltage applied to between the device electrodes, it is preferably in the range of several hundreds angstroms to several microns.

The conductive thin film 4 is laminated on the device electrodes 5, 6 after the device electrodes 5, 6 and the step-forming section 61 have been formed. Although the electron-emitting region 3 is formed linearly in the step-forming section 61 in FIG. 6, the shape and position of the electron-emitting region 61 depend on conditions of the manufacture process, the energization Forming (described later), etc. and are not limited to illustrated ones.

Figure 2A:
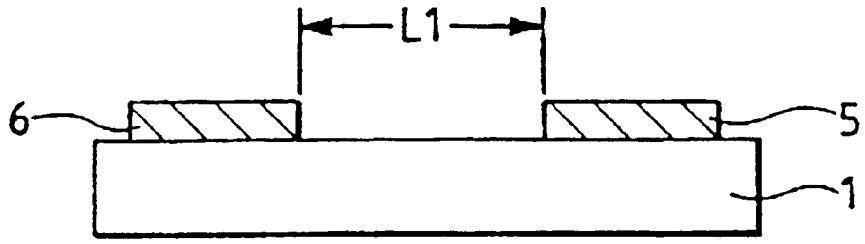
FIGS. 2A, 2B and 2C are schematic views showing exemplary successive manufacture steps of the surface conduction electron-emitting device of the present invention.
Figure 2B:
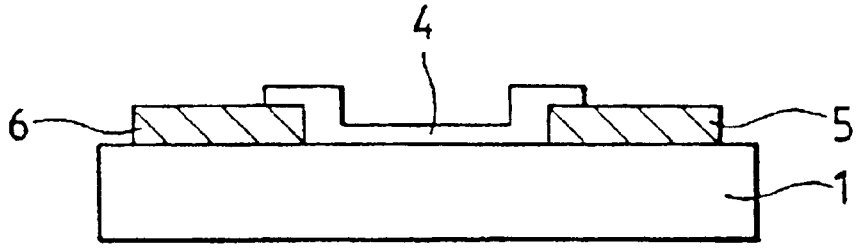
Figure 2C:
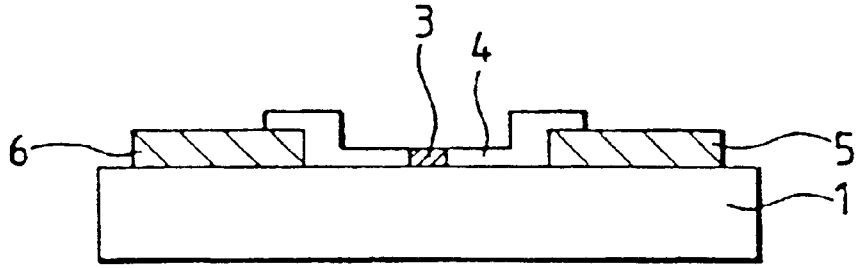

While the surface conduction electron-emitting devices explained above can be manufactured by various methods, one example of the manufacture methods is illustrated in FIGS. 2A to 2C.

One manufacture method will be described below following successive steps with reference to FIGS. 1A and 1B and FIGS. 2A to 2C. In FIGS. 2A to 2C, the same components as those in FIGS. 1A and 1B are denoted by the same reference numerals.

1) The base plate 1 is sufficiently washed with a detergent, pure water and an organic solvent. A device electrode material is then deposited on the base plate by vacuum evaporation, sputtering or the like. After that, the deposited material is patterned by photolithography to form the device electrodes 5, 6 on the base plate 1 (FIG. 2A).

2) Over the base plate 1 including the device electrodes 5, 6 formed thereon, an organic metal solution is coated by spanning or any other suitable process to form an organic metal thin film. The term "organic metal solution" means a solution of an organic metal compound containing, as a primary element, a material metal of the conductive thin film 4. The organic metal thin film is heated for calcination and then patterned by lift-off, etching or the like to form the conductive thin film 4 (FIG. 2B).

More specifically, the base plate on which the organic metal compound has been coated is heated to temperatures not less than the decomposing temperature, so that the organic component of the organic metal compound on the base plate is decomposed to form the conductive thin film 4.

By so heating and calcining the organic metal thin film, the organic component is decomposed at temperatures not higher than 1000° C., particularly about 300° C. in most cases, for transformation into a metal and/or an inorganic metal compound such as metal oxide as mentioned before, or into a compound on a surface of which a simple organic substance having the small number of carbon atoms is adsorbed. Therefore, the heating temperature of the base plate is set to fall in the range of 200° C. to 500° C. for most of organic metal compounds. Thus, the intended conductive thin film 4 can be obtained by thermal decomposition at low temperatures.

From results of the X-ray diffraction method, the inventors found that thin films formed by coating carboxylic ester solutions of the above-described metal carboxylates have no crystallinity, and some of the materials, e.g., Pd acetate, have no melting points and are thermally decomposed without melting when heated, while they remain in the form of thin films.

Further, when using a solvent other than the carboxylic ester, a coated film having no crystallinity can be obtained by adding the above-described carboxylic acid.

Thus, the coated film of the organic metal compound conventionally used tends to have a relatively large crystal structure during the step of heating and calcining so that crystal patterns and boundary lines of the crystal patterns produced during the coating still remain after the step of heating and calcining. This would result in unevenness in the thickness and resistance value of the conductive thin film 4. By contrast, using the organic metal compound of the present invention results in that the coated film exhibits no crystallinity and, hence, has the exactly uniform distribution and thickness on the base plate.

In addition, since the coated film is not melted during the step of heating and calcining, the organic component is transformed into a metal and/or an inorganic metal compound while keeping film evenness as achieved when coated. Note that, as mentioned before, the inorganic metal compound is often aggregated together and has the form of fine particles in the preferable electron-emitting region-forming thin film.

It has proved that several to several thousands metal atoms contained in the organic metal compound are aggregated into fine particles, but characteristics of the electron-emitting devices are held uniform.

As described above, according to the present invention, since an amorphous film or a film in the form of metal crystals is deposited on the base plate of the electron-emitting devices after the step of heating and calcining, the conductive thin film 4 having an even thickness and an even resistance value can be obtained without being affected by the crystal structure developed when using the conventional organic metal compound.

The features of the present invention are not limited to the organic metal compound solution explained above, but also reside in a method of manufacturing the electron-emitting devices by steps of evenly depositing the above organic metal material on the base plate to form the conductive thin film 4 comprising a metal and/or an inorganic metal compound, and then carrying out the energization Forming described later.

3) Subsequently, energization treatment called energization Forming is performed by applying a voltage to between the device electrodes 5, 6 from a power supply (not shown) to form, in part of the conductive thin film 4, the electron-emitting region 3 in which the structure is changed (FIG. 2C). With the energization Forming, the conductive thin film 4 is locally destroyed, deformed or denatured to change the structure in its part. This part is called the electron-emitting region 3.

Figure 4A:
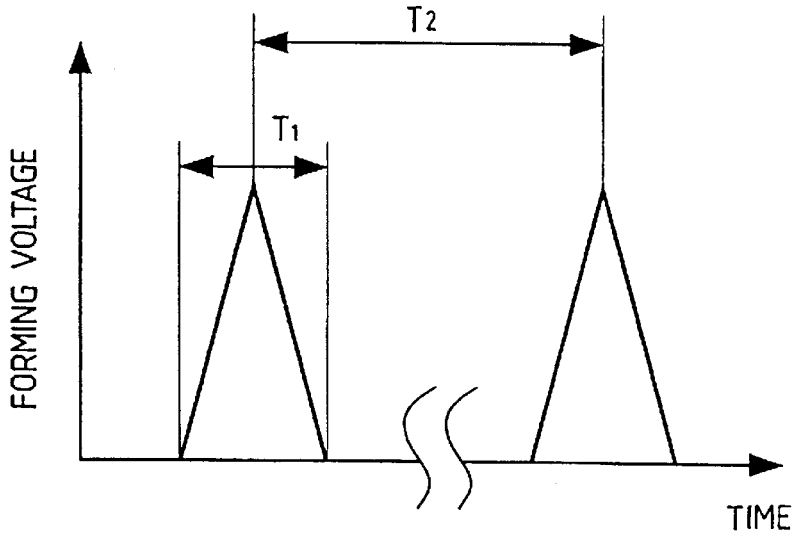
FIGS. 4A and 4B are charts showing examples of voltage waveform suitably used for energization forming in the present invention.
Figure 4B:
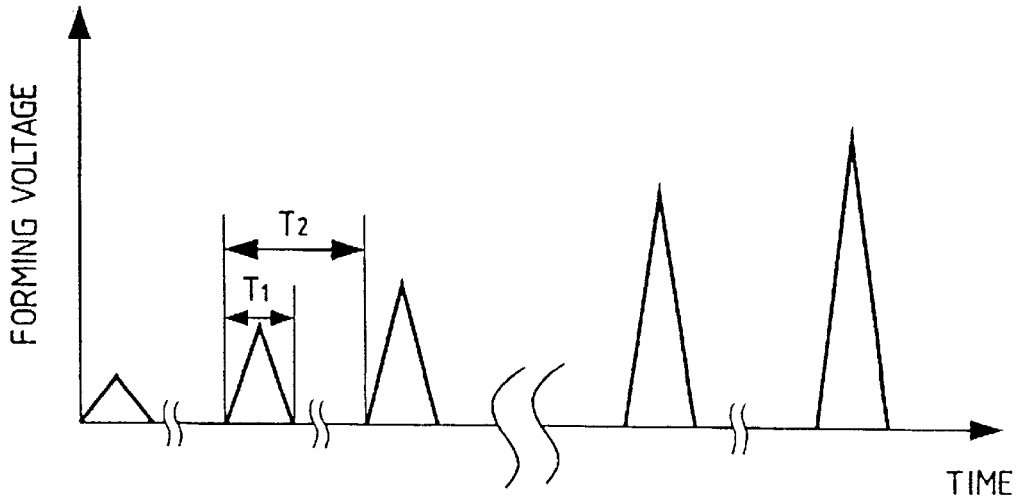

Examples of voltage waveform applied for the energization Forming are shown in FIGS. 4A and 4B.

It is particularly preferable that the voltage waveform be of a pulse-like waveform. The energization Forming can be performed by applying voltage pulses having a constant crest value successively (FIG. 4A), or by applying voltage pulses having crest values gradually increased (FIG. 4B).

In FIG. 4A, T1 and T2 represent respectively a pulse width and a pulse interval of the voltage waveform. Usually, T1 is set to fall in the range of 1 $\mu$s to 10 ms and T2 is set to fall in the range of 10 $\mu$s to 100 ms. A crest value of the triangular waveform (i.e., a peak voltage during the energization Forming) is appropriately selected depending on the type of surface conduction electron-emitting device. Under these conditions, the voltage is applied for a period of several seconds to several tens of minutes at a proper degree of vacuum. The pulse applied between the device electrodes is not limited to the triangular waveform, but may have any other desired waveform such as rectangular one.

In the method shown in FIG. 4B, T1 and T2 are set to similar values as in the method shown in FIG. 4A. A crest value of the triangular waveform (i.e., a peak voltage during the energization Forming) is gradually increased, for example, at a rate of 0.1 V per pulse while keeping a proper degree of vacuum.

The time at which the energization Forming is to be finished can be detected by applying a voltage whose value is so selected as not to locally destroy or deform the conductive thin film 4, measuring a device current, and determining a resistance value during the pulse interval T2. By way of example, a voltage of about 0.1 V is applied between the device electrodes and, when the measured resistance value exceeds 1 MΩ, the energization Forming is finished.

4) After the energization Forming, the surface conduction electron-emitting device is preferably subjected to treatment called an activation process.

The term "activation process" means treatment of repetitively applying a voltage pulse having a constant crest value to between the device electrodes at a vacuum degree of $10^{-4}$ to $10^{-5}$ Torr, for example, as with the energization Forming, for thereby depositing carbon or carbon compounds on the conductive thin film 4 from organic materials present in a vacuum atmosphere so that a device current If and an emission current Ie are remarkably changed.

The activation process is finished, for example, at the time the emission current is saturated, while measuring the device current If and the emission current Ie. The crest value of the applied pulse is preferably set to the operating voltage.

The term "carbon and carbon compounds" used herein means graphite (including the single-crystal and polycrystalline forms) and amorphous carbon (including a mixture of amorphous carbon and polycrystalline graphite). The film thickness of the deposited carbon and carbon compounds is preferably not larger than 500 angstroms, more preferably not larger than 300 angstroms.

5) The surface conduction electron-emitting device thus fabricated is preferably driven in a vacuum atmosphere at a higher degree than that in the Forming process and the activation process. More preferably, the device is driven after heating it to 80° C. to 150° C. in a vacuum atmosphere at such a higher degree of vacuum.

Here, the vacuum atmosphere at a higher degree than that in the Forming process and the activation process means a vacuum atmosphere at a degree of, e.g., about $10^{-6}$ Torr or higher, more preferably a ultra-vacuum atmosphere, in which no appreciable carbon and carbon compounds are newly deposited.

Thus, by so selecting the vacuum atmosphere, further deposition of carbon and carbon compounds is prevented so that the device current If and the emission current Ie are stabilized.

Basic characteristics of the electron-emitting devices suitable for use in the present invention, which are structured and manufactured as explained above, will now be described with reference to FIGS. 3 and 5.

Figure 3:
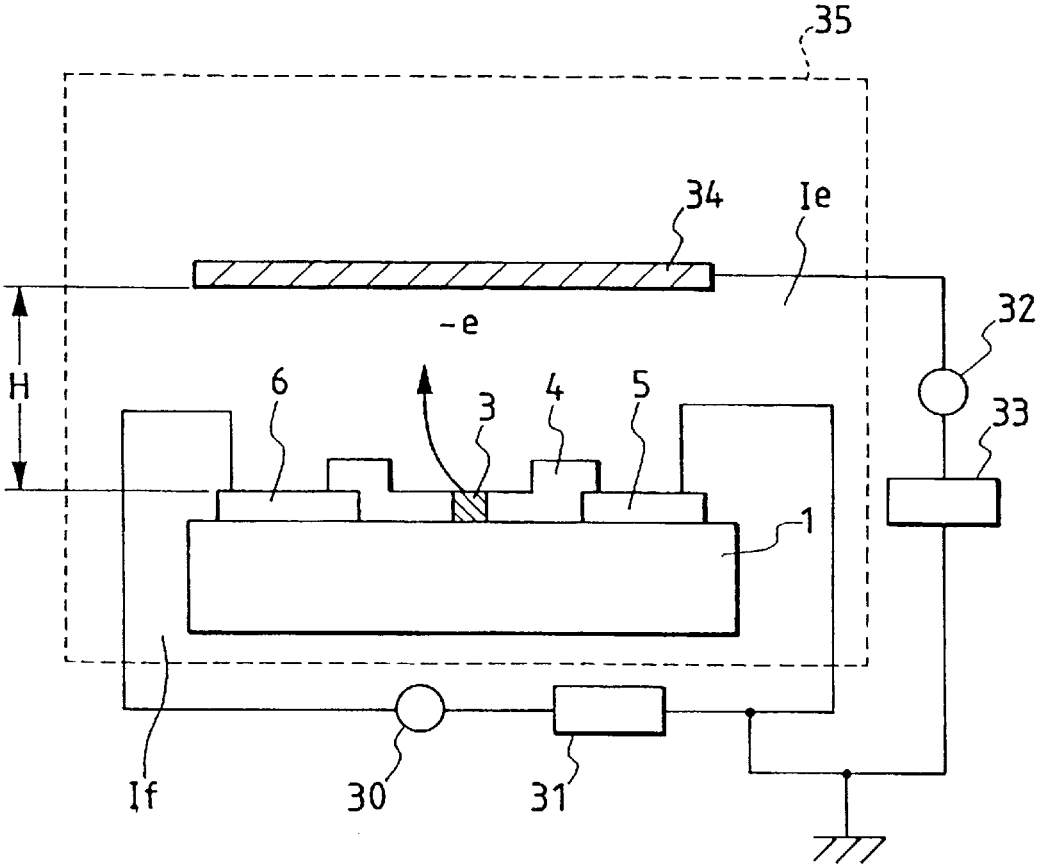
FIG. 3 is a diagram schematically showing a measurement/evaluation apparatus for measuring electron emission characteristics.

FIG. 3 is a schematic view of a measuring/evaluating apparatus for measuring electron emission characteristics of the device having the structure as shown in FIGS. 1A and 1B. In FIG. 3, the same reference numerals as in FIGS. 1A and 1B denote identical parts. Denoted by 31 is a power supply for applying a device voltage Vf to the electron-emitting device, 30 is an ammeter for measuring a device current If flowing through the conductive thin film 4 between the device electrodes 5 and 6, 34 is an anode electrode for capturing an emission current Ie emitted from the electron-emitting region 3 of the device, 33 is a high-voltage power supply for applying a voltage to the anode electrode 34, 32 is an ammeter for measuring the emission current Ie emitted from the electron-emitting region 3 of the device, and 35 is a vacuum apparatus.

The electron-emitting device, the anode electrode 34, etc. are disposed in the vacuum apparatus 35 which is provided with additional necessary units (not shown) such as an evacuation pump and a vacuum gauge, so that the device is measured and evaluated under a desired degree of vacuum.

Therefore, the illustrated measuring device can also be used to perform the steps subsequent to the energization Forming described above.

The measurement is performed by setting the voltage applied to the anode electrode to fall in the range of 1 kV to 10 kV, and the distance H between the anode electrode and the electron-emitting device to fall in the range of 2 mm to 8 mm.

Figure 5:
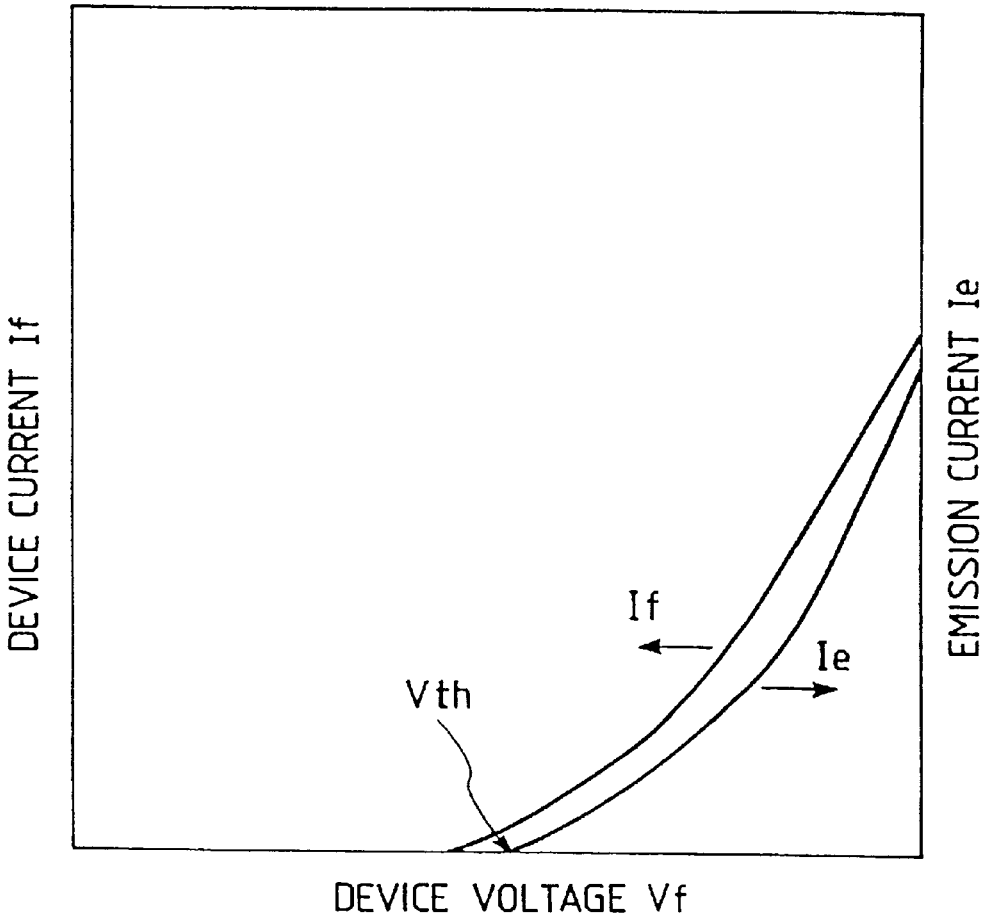
FIG. 5 is a graph showing the typical relationship between an emission current Ie and a device current If of the surface conduction electron-emitting device suitable for use in the present invention.

FIG. 5 shows typical examples of the relationship between the emission current Ie and the device current If and the device voltage Vf measured by the measuring/evaluating apparatus shown in FIG. 3. Note that the graph of FIG. 5 is plotted in arbitrary units because the emission current Ie is much smaller than the device current If. The vertical and horizontal axes each represent a linear scale.

As will be apparent from FIG. 5, the surface conduction electron-emitting device suitable for use in the present invention has three characteristic features with regard to the emission current Ie.

First, the emission current Ie is abruptly increased when the device voltage greater than a certain value (called a threshold voltage, Vth in FIG. 5) is applied, but it is not appreciably detected below the threshold voltage Vth. Thus, the present device is a non-linear device having the definite threshold voltage Vth for the emission current Ie.

Secondly, the emission current Ie increases monotonically depending on the device voltage Vf and, therefore, the emission current Ie can be controlled by the device voltage Vf.

Thirdly, emitted charges captured by the anode electrode 34 depends on the time during which the device voltage Vf is applied. Thus, the amount of charges captured by the anode electrode 34 can be controlled with the time during which the device voltage Vf is applied.

Because of the above three characteristic features of the surface conduction electron-emitting device suitable for use in the present invention, electron emission characteristics can also easily be controlled in an electron source having an array of the numerous electron-emitting devices, an image-forming apparatus using the electron source. etc., meaning that the electron-emitting devices can be applied to a variety of fields.

Further, FIG. 5 illustrates a preferable characteristic example in which the device current If increases monotonically with respect to the device voltage Vf (called MI characteristic). In addition, the device current If may exhibit a voltage controlled negative resistance characteristic (called VCNR characteristic) (not shown) with respect to the device voltage Vf. These characteristics of the device current depend on the manufacture process, the measuring conditions, etc.. In that case, the electron-emitting device of the present invention also has the above three characteristic features.

An electron source and an image-forming apparatus as preferred embodiments of the present invention will be described below.

An electron source or an image-forming apparatus can be made up by arraying a number of surface conduction electron-emitting devices suitable for use in the present invention on a base plate.

The electron-emitting devices can be arrayed on a base plate by several methods. By one method, the numerous surface conduction electron-emitting devices are arrayed side by side (in a row direction) and interconnected at both ends of the devices by wirings to form a row of electron-emitting devices, this row of electron-emitting devices being arranged in a large number to construct an electron source in ladder wiring. Control electrodes (called also grids) are disposed in a space above the electron source to lie in a direction (called a column direction) perpendicular to the row-direction wirings for controlling emission of electrons from the electron-emitting devices. By another method, n lines of Y-direction wirings are disposed over m lines of X-direction wirings with the intervention of an interlayer insulating layer between, and the X-direction wirings and the Y-direction wirings are connected to respective ones of paired device electrodes of the surface conduction electron-emitting devices. The latter arrangement will be hereinafter referred to as simple matrix wiring. A description will first be made of the simple matrix wiring in detail.

With the above-described three features in basic characteristics of the surface conduction electron-emitting device suitable for use in the present invention, electrons emitted from each of the surface conduction electron-emitting devices in the simple matrix wiring are also controlled depending on the crest value and width of a pulse-like voltage applied to between the device electrodes opposed to each other when the applied voltage is higher than the threshold value. On the other hand, almost no electrons are emitted at the voltage lower than the threshold value. Based on these characteristics, even when the surface conduction electron-emitting devices are arrayed in large number, it is possible to select any desired one of the electron-emitting devices and to control the amount of electrons emitted therefrom in response to an input signal by properly applying the pulse-like voltage to each corresponding device.

The structure of an electron source base plate arranged in accordance with the above principle will be described below with reference to FIG. 7. Denoted by 71 is an electron source base plate, 72 is an X-direction wiring, 73 is a Y-direction wiring, 74 is a surface conduction electron-emitting device, and 75 is a connecting wire. The surface conduction electron-emitting device 74 may be of either the plane or step type.

Figure 7:
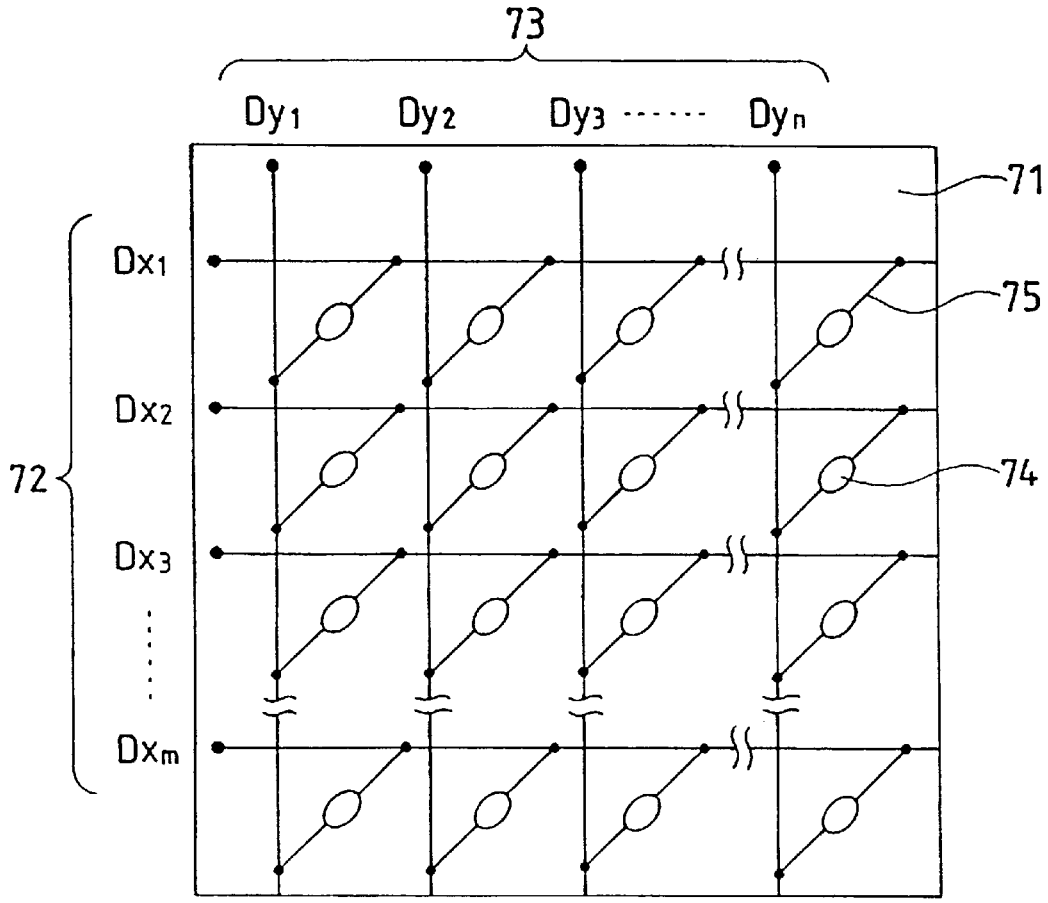
FIG. 7 is a diagram of an electron source in simple matrix wiring.

In FIG. 7, the electron source base plate 71 is of a glass base plate or the like as previously described. The number of surface conduction electron-emitting devices arrayed on the base plate and the design shape of each device are appropriately set depending on the application.

Then, m lines of X-direction wirings 72, indicated by Dx1, Dx2, . . . , Dxm, are formed using a conductive metal or the like by vacuum evaporation, printing, sputtering or the like. The material, film thickness and wiring width are set so that a voltage as uniform as possible is supplied to all of the numerous surface conduction electron-emitting devices. Also, Y-direction wirings 73 are made up of n lines of Dy1, Dy2, . . . , Dyn and are formed in a like manner to the X-direction wirings 72. An interlayer insulating layer (not shown) is interposed between the m lines of X-direction wirings 72 and the n lines of Y-direction wirings 73 to electrically isolate the wirings 72, 73 from each other, thereby making up simple matrix wiring. (Note that m, n are each a positive integer).

The not-shown interlayer insulating layer is made of $SiO_2$ or the like which is formed by vacuum evaporation, printing, sputtering or the like into a desired shape so as to cover the entire or partial surface of the base plate 71 on which the X-direction wirings 72 have been formed. The thickness, material and fabrication process of the interlayer insulating layer is appropriately set so as to endure the potential difference, particularly, in portions where the X-direction wirings 72 and the Y-direction wirings 73 intersect each other. The X-direction wirings 72 and the Y-direction wirings 73 are led out to provide external terminals.

Further, respective opposite electrodes (not shown) of the surface conduction electron-emitting devices 74 are electrically connected to the m lines of X-direction wirings 72 and the n lines of Y-direction wirings 73 by the connecting wires 75 which are formed using a conductive metal or the like by vacuum evaporation, printing, sputtering or the like.

The conductive metals used for the m lines of X-direction wirings 72, the n lines of Y-direction wirings 73, the connecting leads 75 and the device electrodes opposed to each other may be the same in part or all of the constituent elements, or may be different from one another. Note that when the device electrodes and the wirings connected thereto are made of the same material, the term "device electrodes" may be used to mean both the device electrodes and the wirings together. Incidentally, the surface conduction electron-emitting devices may be formed on either the base plate 71 or the interlayer insulating layer (not shown).

Though described later in detail, the X-direction wirings 72 are electrically connected to a scan signal generating means (not shown) for applying a scan signal to scan each row of the surface conduction electron-emitting devices 74, which are arrayed in the X-direction, in response to an input signal.

On the other hand, the Y-direction wirings 73 are electrically connected to a modulation signal generating means (not shown) for applying a modulation signal to modulate each column of the surface conduction electron-emitting devices, which are arrayed in the Y-direction, in response to an input signal.

Additionally, a driving voltage applied to each of the surface conduction electron-emitting devices is supplied as a differential voltage between the scan signal and the modulation signal both applied to that device.

With the simple matrix wiring described above, the individual devices can be selected and driven independently of one another.

Figure 8:
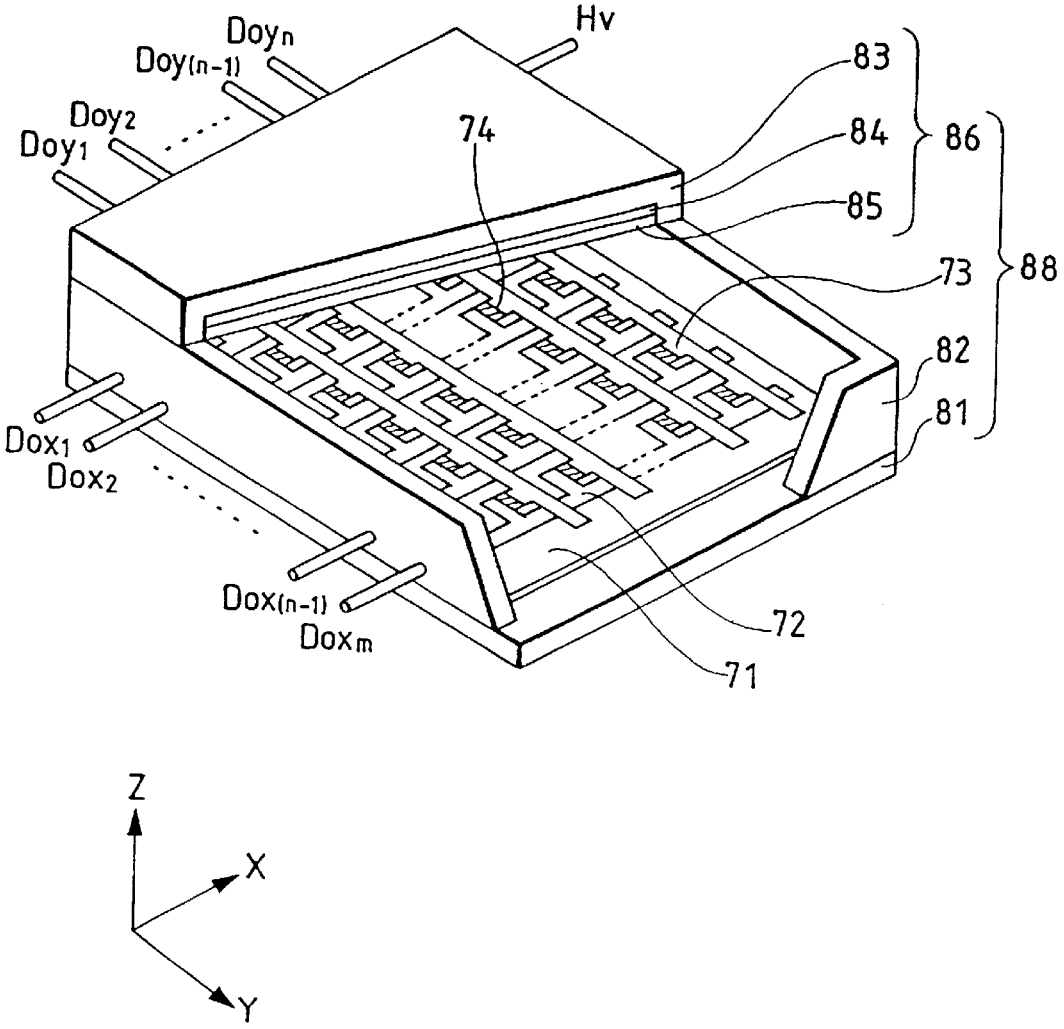
FIG. 8 is a perspective view, partly broken, schematically showing a display panel of an image-forming apparatus.
Figure 9A:
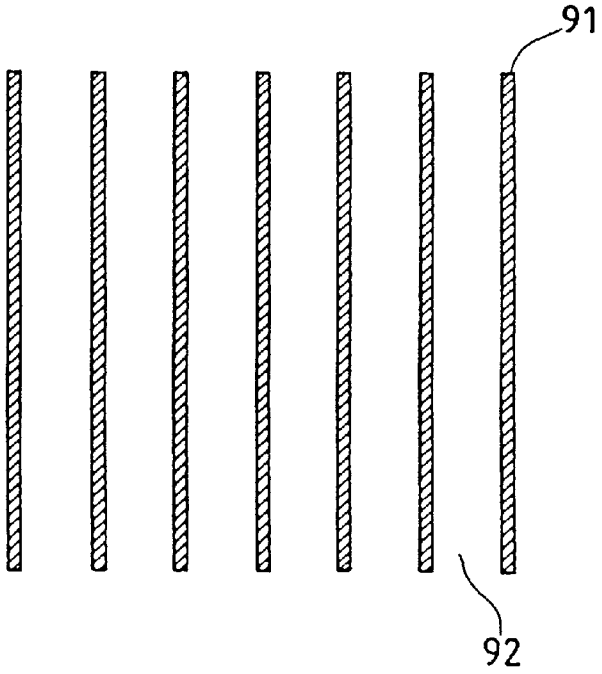
FIGS. 9A and 9B are schematic views showing examples of a fluorescent film.
Figure 9B:
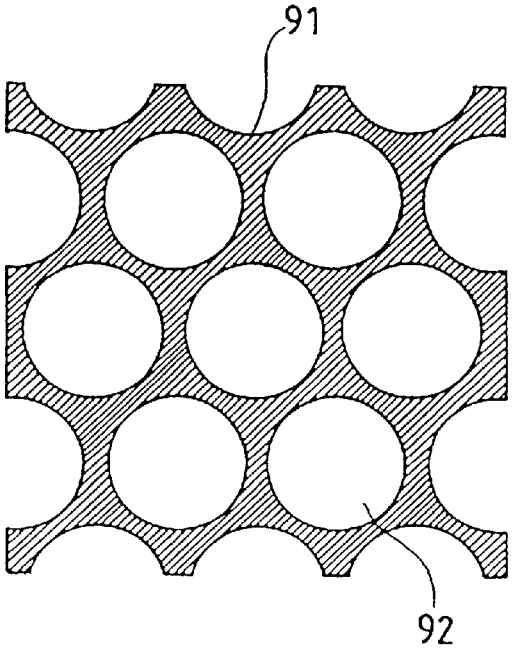
Figure 10:
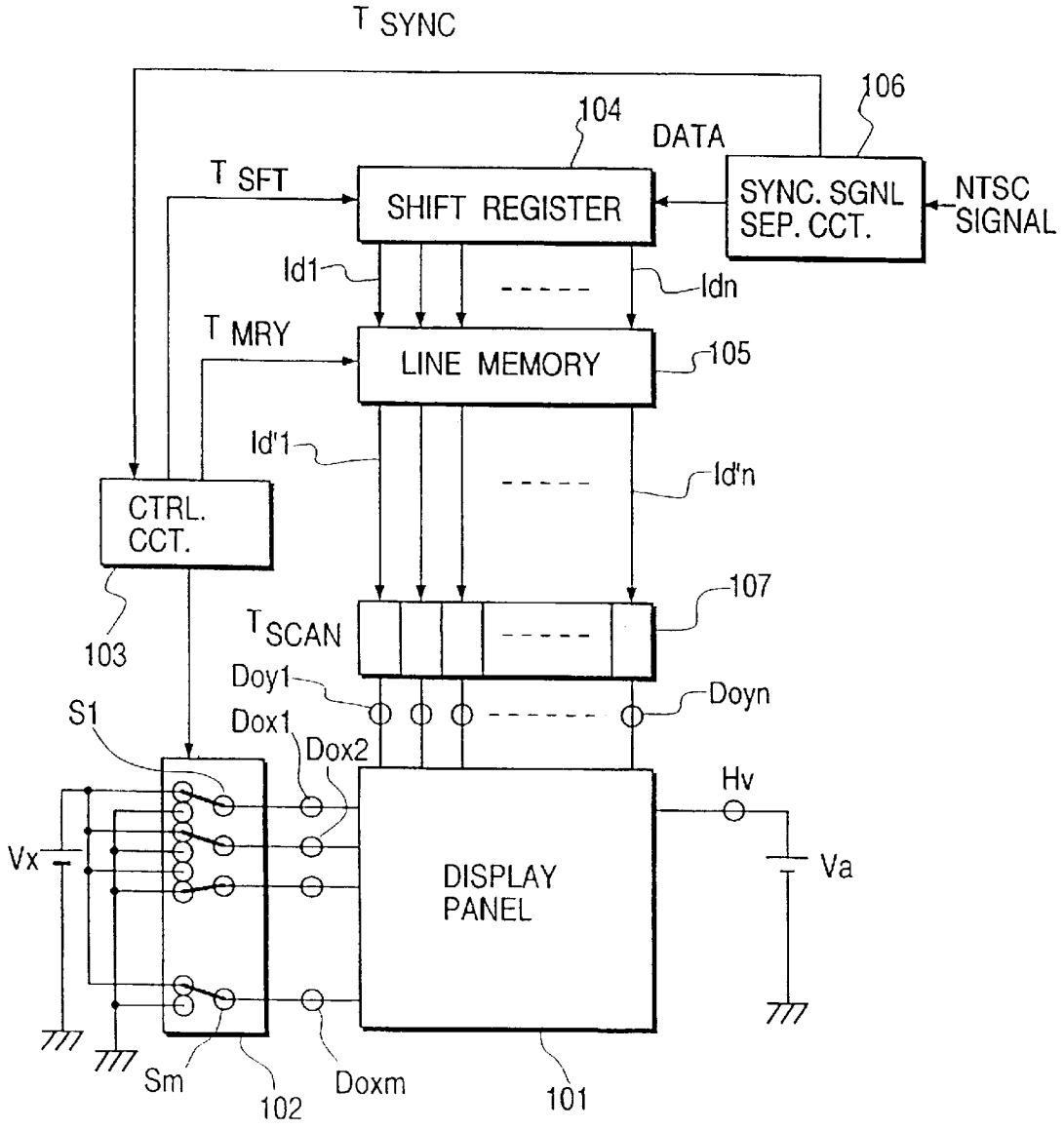
FIG. 10 is a block diagram showing one example of a driving circuit for the image-forming apparatus adapted to display an image in accordance with TV signals of NTSC standards.

A description will now be made, with reference to FIGS. 8, 9A, 9B and 10, of an image-forming apparatus in which the thus-manufactured electron source in the simple matrix wiring is employed for display of images and other purposes. FIG. 8 is a schematic view showing the basic structure of a display panel of the image-forming apparatus, FIGS. 9A and 9B are schematic views of fluorescent films, and FIG. 10 is a block diagram of a driving circuit shown an example in which the image-forming apparatus displays an image in accordance with TV signals of NTSC standards.

In FIG. 8, denoted by 71 is an electron source base plate on which a number of surface conduction electron-emitting devices are manufactured as described above, 81 is a rear plate to which the electron source base plate 71 is fixed, 86 is a face plate fabricated by laminating a fluorescent film 84 and a metal back 85 on an inner surface of a glass base plate 83, and 82 is a support frame. After applying frit glass or the like to joined portions between the rear plate 81, the support frame 82 and the face plate 86, the assembly is baked in an atmosphere of air or nitrogen gas at 400° C. to 500° C. for 10 minutes or more to hermetically seal the joined portions, thereby making up an envelope 88.

In FIG. 8, reference numeral 74 represents the electron-emitting region in FIGS. 1A and 1B and 72, 73 represent X- and Y-direction wirings connected to respective ones of the paired device electrodes of the surface conduction electron-emitting devices.

The envelope 88 is made up by the face plate 86, the support frame 82 and the rear plate 81 in the illustrated embodiment. However, since the rear plate 81 is provided for the purpose of mainly reinforcing the strength of the base plate 71, the rear plate 81 as a separate member can be dispensed with if the base plate 71 itself has a sufficient degree of strength. In this case, the support frame 82 may be directly joined to the base plate 71 in a hermetically sealed manner, thereby making up the envelope 88 by the face plate 86, the support frame 82 and the base plate 71. Alternatively, a not-shown support called a spacer may be disposed between the face plate 86 and the rear plate 81 so that the envelope 88 has a sufficient degree of strength against the atmospheric pressure.

FIGS. 9A and 9B schematically show examples of the fluorescent film 84. The fluorescent film 84 can be formed of fluorescent substances alone for monochrome display. For color display, the fluorescent film 84 is formed by a combination of black conductors 91 and fluorescent substances 92, the black conductors 91 being called black stripes or a black matrix depending on patterns of the fluorescent substances. The purpose of providing the black stripes or black matrix is to provide black areas between the fluorescent substances 92 in three primary colors necessary for color display, so that color mixing becomes less conspicuous and a reduction in contrast caused by reflection of exterior light by the fluorescent film 84 is suppressed. The black stripes or the like can be made of not only materials containing graphite as a main ingredient which are usually employed in the art, but also any other materials which are conductive and have small transmittance and reflectance to light.

Fluorescent substances can be coated on the glass base plate 83 by precipitation, printing or the like regardless of whether the image is monochrome or colored.

On an inner surface of the fluorescent film 84, the metal back 85 is usually provided. The metal back has functions of increasing the luminance by mirror-reflecting light, that is emitted from the fluorescent substances to the inner side, toward the face plate 86, serving as an electrode to apply a voltage for accelerating electron beams, and protecting the fluorescent substances from being damaged by collisions with negative ions produced in the envelope. The metal back can be fabricated, after forming the fluorescent film, by smoothing an inner surface of the fluorescent film (this step being usually called filming) and then depositing Al thereon by vacuum evaporation, for example.

To increase conductivity of the fluorescent film 84, the face plate 86 may include a transparent electrode (not shown) provided on an outer surface of the fluorescent film 84.

Before hermetically sealing the envelope as explained above, careful alignment must be performed in the case of color display so that the fluorescent substances in respective colors and the electron emitting devices are precisely positioned corresponding to each other.

The envelope 88 is evacuated through an evacuation tube (not shown) to a vacuum degree of about $10^{-7}$ Torr and then hermetically sealed off. To maintain such a vacuum degree in the sealed envelope 88, the envelope may be subjected to gettering. This process is performed by, immediately before or after sealing off the envelope 88, heating a getter disposed in a predetermined position (not shown) within the envelope 88 by resistance heating or high-frequency heating so as to form an evaporation film of the getter. The getter usually contains Ba as a primary component. The inner space of the envelope can be maintained at a vacuum degree in the range of $1\times10^{-5}$ to $1\times10^{-7}$ Torr by the adsorbing action of the evaporation film. Incidentally, the steps subsequent to the energization Forming of the surface conduction electron-emitting devices are appropriately set.

One exemplary configuration of a driving circuit for displaying a TV image in accordance with TV signals of NTSC standards on a display panel constructed by using the electron source in the simple matrix wiring will be described below with reference to the block diagram of FIG. 10. In FIG. 10, denoted by 101 is a display panel, 102 is a scanning circuit, 103 is a control circuit, 104 is a shift register, 105 is a line memory, 106 is a synch signal separating circuit, 107 is a modulation signal generator, and Vx and Va are DC voltage sources.

Functions of those components will be described below one by one. The display panel 101 is connected to the external electrical circuits through terminals Dox1 to Doxm, terminals Doy1 to Doyn, and a high-voltage terminal Hv. Applied to the terminals Dox1 to Doxm is a scan signal for successively driving the electron source provided in the display panel, i.e., a group of surface conduction electron-emitting devices wired into a matrix of M rows and N columns, on a row-by-row basis (i.e., in units of N devices).

On the other hand, applied to the terminals Doy1 to Doyn is a modulation signal for controlling electron beams output from the surface conduction electron-emitting devices in one row selected by the scan signal. The high-voltage terminal Hv is supplied with a DC voltage of 10 kV, for example, from the DC voltage source Va. This DC voltage serves as an accelerating voltage for giving the electron beams emitted from the surface conduction electron-emitting devices energy enough to excite the corresponding fluorescent substances.

The scanning circuit 102 will now be described. The scanning circuit 102 includes a number M of switching devices (symbolically shown by S1 to Sm in FIG. 10). Each of the switching devices selects an output voltage of the DC voltage source Vx or 0 V (ground level), and is electrically connected to corresponding one of the terminals Dox1 to Doxm of the display panel 101. The switching devices S1 to Sm are operated in accordance with a control signal Tscan output by the control circuit 103, and are easily made up by a combination of typical switching devices such as FETs.

The DC voltage source Vx outputs a constant voltage set in this embodiment based on characteristics of the surface conduction electron-emitting devices (i.e., electron-emitting threshold voltage) so that the driving voltage applied to the devices not under scanning is kept lower than the electron-emitting threshold voltage.

The control circuit 103 functions to make the various components operate with each other so as to properly display an image in accordance with video signals input from the outside. Thus, in accordance with a synch signal Tsyn supplied from the synch signal separating circuit 106 described next, the control circuit 103 generates control signals Tscan, Tsft and Tmry to the associated components.

The synch signal separating circuit 106 is a circuit for separating a synch signal component and a luminance signal component from an NTSC TV signal applied from the outside and, as well known, can easily be made up using frequency separators (filters). The synch signal separated by the synch signal separating circuit 106 comprises, as well known, a vertical synch signal and a horizontal synch signal, but it is here represented by the signal Tsync for convenience of description. Also, the video luminance signal component separated from the TV signal is represented by a signal DATA for convenience of description. The signal DATA is input to the shift register 104.

The shift register 104 carries out serial/parallel conversion of the signal DATA, which is time-serially input to the register, for each line of an image. The shift register 104 is operated by the control signal Tsft supplied from the control circuit 103 (hence, the control signal Tsft can be said as a shift clock for the shift register 104). Data for one line of the image (corresponding to data for driving the number N of electron-emitting devices) resulted from the serial/parallel conversion is output from the shift register 104 as a number N of parallel signals Id1 to Idn.

The line memory 105 is a memory for storing the data for one line of the image for a period of time as long as required. The line memory 105 stores the contents of the parallel signals Id1 to Idn in accordance with the control signal Tmry supplied from the control circuit 103. The stored contents are output as I'd1 to I'dn and applied to the modulation signal generator 107.

The modulation signal generator 107 is a signal source for properly driving the surface conduction electron-emitting devices in accordance with the respective video data I'd1 to I'dn in a modulated manner. Output signals from the modulation signal generator 107 are applied to the corresponding surface conduction electron-emitting devices in the display panel 101 through the terminals Doy1 to Doyn.

Also as described above, the electron-emitting devices used in the display panel of this embodiment each have basic characteristics below with regards to the emission current Ie. Specifically, the electron-emitting device has a definite threshold voltage Vth for emission of electrons and emits electrons only when a voltage exceeding Vth is applied.

In addition, for the voltage exceeding the electron emission threshold, the emission current is also changed depending on changes in the voltage applied to the device. While a value of the threshold voltage Vth for emission of electrons and a change rate of the emission current with respect to the applied voltage may be varied depending on the material, structure and manufacture process of the electron-emitting device, the following is true in any case.

When a pulse-like voltage is applied to the device, no electrons are emitted if the applied voltage is lower than the electron emission threshold value, but an electron beam is produced if the applied voltage exceeds the electron emission threshold value. On this occasion, the intensity of the produced electron beam can be controlled by changing a crest value Vm of the pulse. Further, the total amount of charges of the produced electron beam can be controlled by changing a width Pw of the pulse.

Thus, the electron-emitting device can be modulated in accordance with an input signal by a voltage modulating method, a pulse width modulating method and so on. In the case of employing the voltage modulating method, the modulation signal generator 107 can be realized by using a circuit of voltage modulation type which generates a voltage pulse having a fixed length and modulates a crest value of the voltage pulse in accordance with input data.

In the case of employing the pulse width modulating method, the modulation signal generator 107 can be realized by using a circuit of pulse width modulation type which generates a voltage pulse having a fixed crest value and modulates a width of the voltage pulse in accordance with input data.

Through a series of operations explained above, the display panel 101 can display TV images. Although not specified in the above description, the shift register 104 and the line memory 105 may be designed to be adapted for any of digital signals and analog signals. Anyway, it is essential that the serial/parallel conversion and storage of video signals be effected at a predetermined speed.

For digital signal design, it is required to convert the signal DATA output from the synch signal separating circuit 106 into a digital signal, but this can easily be realized just by incorporating an A/D converter in an output portion of the circuit 106. Further, depending on whether the output signal of the line memory 105 is digital or analog, the circuit used for the modulation signal generator 107 must be designed in somewhat different ways. More specifically, when the voltage modulating method using a digital signal is employed, the modulation signal generator 107 is modified to include a well-known D/A converter, for example, and an amplifier, etc. are added if necessary. When the pulse width modulating method using a digital signal is employed, the modulation signal generator 107 can easily be made up by those skilled in the art by using a circuit in combination of, for example, a high-speed oscillator, a counter for counting the number of waves output from the oscillator, and a comparator for comparing between an output value of the counter and an output value of the line memory. In this case, if necessary, an amplifier for amplifying a voltage of the modulation signal, which is output from the comparator and has a modulated pulse width, to the driving voltage for the surface conduction electron-emitting devices may also be added.

On the other hand, when the voltage modulating method using an analog signal is employed, the modulation signal generator 107 can be made up by an amplifier using, e.g., a well-known operational amplifier and, if necessary, may additionally include a level shift circuit. When the pulse width modulating method using an analog signal is employed, the modulation signal generator 107 can be made up by a voltage controlled oscillator (VCO), for example. In this case, if necessary, an amplifier for amplifying a voltage of the modulation signal to the driving voltage for the surface conduction electron-emitting devices may also be added.

In the thus-arranged image-forming apparatus as a preferred embodiment of the present invention, electrons are emitted by applying a voltage to the electron-emitting devices through the terminals Dox1 to Doxm and Doy1 to Doyn extending outwardly of the envelope. The electron beams are accelerated by applying a high voltage to the metal back 85 or the transparent electrode (not shown) through the high-voltage terminal Hv. The accelerated electrons impinge against the fluorescent film 84 and hence the fluorescent substances which are excited to generate fluorescence to form an image.

The above-explained arrangements are an outline necessary for fabricating the image-forming apparatus suitable for use in display of images, and details of the apparatus, such as materials of the individual members, are not limited to the illustrated examples, but may appropriately selected to be suitable for specific application of the image-forming apparatus. The input signal is not limited to an NTSC TV signal mentioned above, but may be any of other TV signals of PAL- and SECAM-standards, including another type of TV signal (e.g., so-called high-quality TV signal of MUSE-standards) having the larger number of scan lines than the above types.

An electron source in ladder wiring referred above and an image-forming apparatus using such an electron source will now be described with reference to FIGS. 11 and 12.

Figure 11:
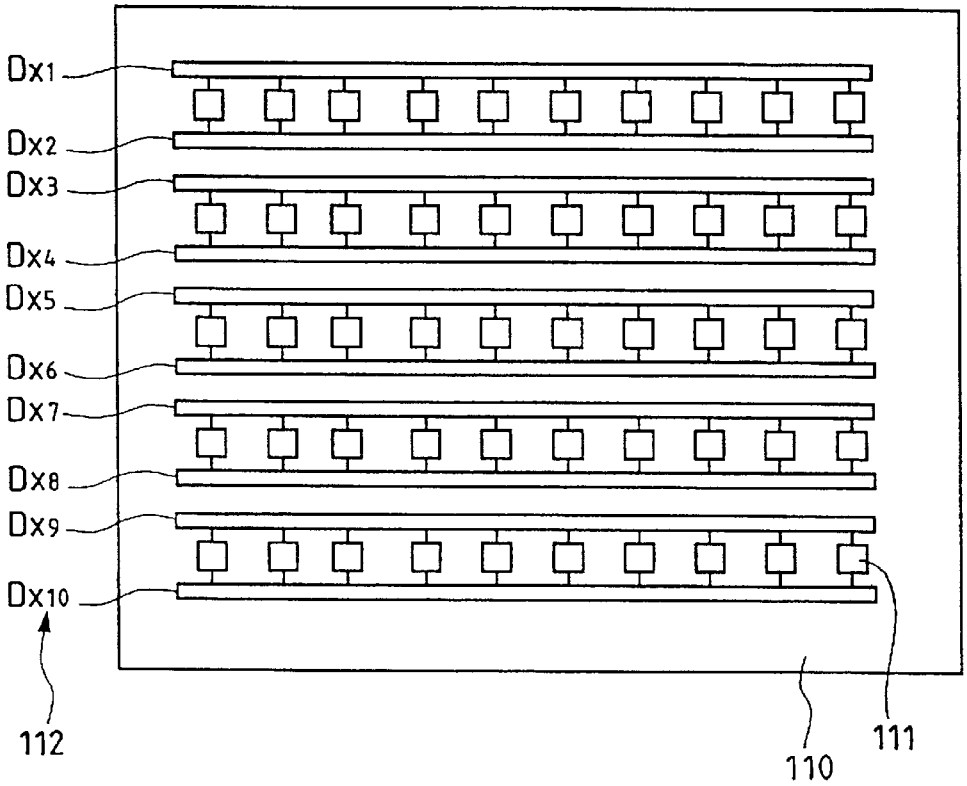
FIG. 11 is a schematic view showing an electron source in ladder wiring.

In FIG. 11, denoted by 110 is an electron source base plate, 111 is an electron-emitting device, and 112 is a common wiring for interconnecting the electron-emitting devices 111 as indicated by Dx1 to Dx10. A plurality of electron-emitting devices 111 are arrayed on the base plate 110 side by side to line up in the X-direction (a resulting row of the electron-emitting devices being called a device row). This device row is arranged in plural number so as to make up an electron source. By properly applying a driving voltage to between the common wirings of each device row, respective device rows can be driven independently of one another. Specifically, a voltage exceeding the electron emission threshold value is applied to the device rows from which electron beams are to be emitted, whereas a voltage lower than the electron emission threshold value is applied to the device rows from which electron beams are not to be emitted. Incidentally, those pairs of the common wirings Dx2 to Dx9 which are between two adjacent device rows, e.g., Dx2 and Dx3, may be each formed as a single wiring.

Figure 12:
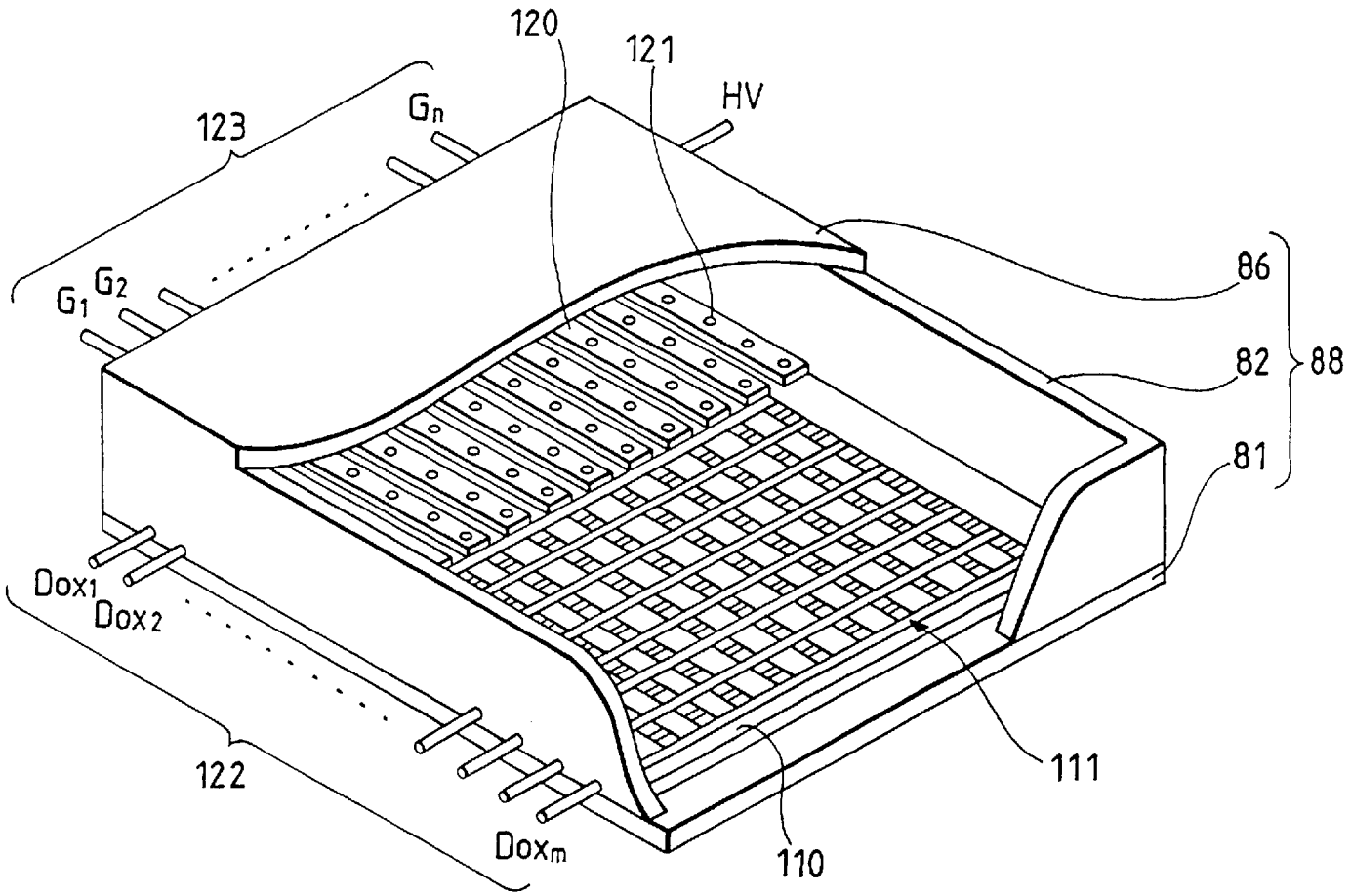
FIG. 12 is a perspective view, partly broken, schematically showing another display panel of the image-forming apparatus.

FIG. 12 shows the structure of a display panel of the image-forming apparatus including the electron source in the ladder wiring. Denoted by 120 is a grid electrode, 121 is an aperture for allowing electrons to pass therethrough, 122 is an external extending out of the envelope as indicated by Dox1, Dox2, . . . , Doxm, 123 is an external extending out of the envelope as indicated by G1, G2, . . . , Gn and connected to the corresponding grid electrodes 120, and 110 is an electron source base plate in which common wirings between the adjacent device rows are each formed as a single wiring, as suggested above. Note that the same reference numerals as those in FIGS. 8 and 11 denote identical members. The image-forming apparatus of this embodiment is principally different from the image-forming apparatus in the simple matrix wiring (shown in FIG. 8) in that the grid electrodes 120 are interposed between the electron source base plate 110 and the face plate 86.

Between the base plate 110 and the face plate 86, the grid electrodes 120 are disposed for modulating electron beams emitted from the surface conduction electron-emitting devices. The grid electrodes 120 are stripe-shaped electrodes extending perpendicularly to the device rows in the ladder wiring, and have circular apertures 121 formed therein for passage of the electron beams in one-to-one relation to the electron-emitting devices. The shape and position of the grid electrodes are not necessarily limited to ones illustrated in FIG. 12. For example, the apertures may be a large number of mesh-like small openings, or may be positioned in surroundings or vicinity of the surface conduction electron-emitting devices.

The externally extending terminals 122 and the externally extending grid terminals 123 are electrically connected to a control circuit (not shown).

In the image-forming apparatus of this embodiment, irradiation of the electron beams upon fluorescent substances can be controlled to display an image on a line-by-line basis by simultaneously applying modulation signals for one line of the image to each row of the grid electrode in synch with the device rows being driven (scanned) successively in units of row.

According to the concept of the present invention, there can be provided an image-forming apparatus which is suitable as not only a display for TV broadcasting, but also displays for TV conference systems, computers and so on. Further, the image-forming apparatus can also be combined with an optical printer comprising a photosensitive drum and so on.

EXAMPLE 1

As an electron-emitting device of this Example, an electron-emitting device of the type shown in FIGS. 1A and 1B was fabricated. FIGS. 1A and 1B are respectively a plan and sectional views of the device. In FIGS. 1A and 1B, denoted by reference numeral 1 is an insulating base plate, 5 and 6 are device electrodes for applying a voltage to the device, 4 is a thin film including an electron-emitting region, and 3 is an electron-emitting region. Additionally, in FIGS. 1A and 1B, L1 represents the spacing between the device electrodes 5 and 6, W1 the width of the device electrodes, d the thickness of the device electrodes, and W2 the width of the device.

The manufacture process of the electron-emitting device of this embodiment will be described below with reference to FIGS. 2A to 2C.

A quartz plate was used as the insulating base plate 1 and, after sufficiently washing it with an organic solvent, the device electrodes 5, 6 made of Ni were formed on the surface of the base plate 1 (FIG. 2A). At this time, the spacing L1 between the device electrodes was set to 3 microns, the width W1 of the device electrodes was set to 500 microns, and the thickness d thereof was set to 1000 angstroms.

A coating solution was prepared by dissolving, as an organic metal compound, 0.01 mol (2.249 g) of palladium acetate in 100 ml of acetone. The coating solution was coated on the insulating base plate 1 including the device electrodes 5, 6 formed thereon by using a spinner made by Mikasa Co. Ltd. at 1000 rpm for 30 seconds, thereby forming a film. The base plate was then heated to 300° C. inside an oven in an atmosphere of air, causing the organic metal compound to be decomposed and deposited on the base plate to form a fine particle film comprising palladium oxide fine particles (average size: 70 angstroms), thereby producing an electron-emitting region-forming thin film 2 (FIG. 2B). It was confirmed by X-ray analysis that the fine particles were made of palladium oxide. The electron-emitting region-forming thin film 2 had a width (corresponding to the device width) W of 300 microns and was positioned almost centrally between the device electrodes 5 and 6. Also, the thickness of the electron-emitting region-forming thin film 2 was 100 angstroms and the sheet resistance value thereof was $5\times10^4$ Ω/□.

Here, the fine particle film means a film comprising a number of fine particles aggregated together and having microstructures in which individual fine particles are not only individually dispersed away from each other, but also adjacent to or overlapped with each other (including an island pattern). The size of the fine particles means a size of those fine particles whose shape can be discerned in any of the above forms.

Next, as shown in FIG. 2C, the electron-emitting region 3 was formed by applying a voltage to between the device electrodes 5, 6 for the energization treatment (Forming treatment) of the electron-emitting region-forming thin film 2. The voltage waveform used in the Forming treatment is shown in FIG. 4A.

In FIG. 4A, T1 and T2 represent respectively a pulse width and a pulse interval of the voltage waveform. In this Example, on condition that T1 was set to 1 ms, T2 was set to 10 ms, and a crest value of the triangular waveform (i.e., a peak voltage during the energization Forming) was set to 5 V, the Forming treatment was performed in a vacuum atmosphere of about $1\times10^{-6}$ Torr for 60 seconds.

In the electron-emitting region 3 thus formed, fine particles of palladium as a primary constituent element were dispersed and the average size of the fine particles was 30 angstroms.

The device fabricated as above was measured for its characteristic of electron emission. The structure of a measuring/evaluating apparatus is schematically shown in FIG. 3.

In FIG. 3, denoted by 1 is an insulating base plate, 5 and 6 are device electrodes for applying a voltage to the device, 4 is a thin film including an electron-emitting region, and 3 is an electron-emitting region, as with FIGS. 1A and 1B. In addition, denoted by 31 is a power supply for applying a voltage to the device, 30 is an ammeter for measuring a device current If, 34 is an anode electrode for measuring an emission current Ie emitted from the device, 33 is a high-voltage power supply for applying a voltage to the anode electrode 34, and 32 is an ammeter for measuring the emission current Ie. When measuring the device current If and the emission current Ie of the electron-emitting device, the power supply 31 and the ammeter 30 were connected to the device electrodes 5, 6, and the anode electrode 34 connected to the power supply 3 and the ammeter 32 was disposed above the electron-emitting device. Further, the electron-emitting device and the anode electrode 34 were disposed in a vacuum apparatus 35 including additional necessary units (not shown) such as an evacuation pump and a vacuum gauge, enabling the device to be measured and evaluated under a desired degree of vacuum. In this Example, the distance between the anode electrode and the electron-emitting device was set to 4 mm, the potential of the anode electrode was set to 1 kV, and the vacuum degree in the vacuum apparatus during the measurement of electron emission characteristics was set to $1\times10^{-6}$ Torr.

As a result of applying the device voltage to between the device electrodes 5 and 6 of the electron-emitting device and measuring the device current If and the emission current Ie generated then by using the above measuring/evaluating apparatus, current versus voltage characteristics as shown in FIG. 5 were obtained. In the measured device, the emission current Ie was abruptly increased from about 8 V of the device voltage Vf. At 16 V of the device voltage Vf, the device current If was 2.2 mA and the emission current Ie was 1.1 $\mu$A. Thus, the electron emission efficiency $\eta$=Ie/If (%) was 0.05%.

In this Example described above, while the Forming treatment was performed by applying pulses in the triangular waveform to between the device electrodes for forming the electron-emitting region, the pulse waveform applied to between the device electrodes is not limited to the triangular waveform, but may have any other desired waveform such as rectangular one. The crest value, width and interval of the pulses are also not limited to the above-mentioned values, but may be set to any other desired values so long as the electron-emitting region is satisfactorily formed.

EXAMPLE 2

In a similar manufacture process of electron-emitting devices as in above Example 1, a coating solution was prepared by dissolving, as an organic metal compound, 0.01 mol (2.488 g) of nickel acetate (4 hydrates) in 100 ml of water. The coating solution was coated on the insulating base plate 1 including the device electrodes 5, 6 formed thereon by using a spinner. The base plate was then heated to 350° C., causing the organic metal compound to be decomposed and deposited on the base plate to form a fine particle film comprising nickel oxide fine particles (average size: 60 angstroms), thereby producing an electron-emitting region-forming thin film 2 (FIG. 2B). It was confirmed by X-ray analysis that the fine particles were made of nickel oxide.

EXAMPLE 3

A coating solution was prepared by dissolving, as an organic metal compound, 0.01 mol (2.249 g) of palladium acetate in 1000 ml of butyl acetate. The coating solution was coated on the insulating base plate 1 including the device electrodes 5, 6 formed thereon by using a spinner made by Mikasa Co. Ltd. at 1000 rpm for 30 seconds.

As a result of X-ray analysis (XD) of the coated film in this Example, it was confirmed that the diffraction patterns of Pd acetate observed in X-ray analysis (powder XD) was not found and the coated film had no crystallinity.

The base plate was then heated to 300° C. inside an oven in an atmosphere of air, causing the organic metal compound to be decomposed and deposited on the base plate to form a fine particle film comprising palladium oxide fine particles (average size: 75 angstroms), thereby producing an electron-emitting region-forming thin film 2 (FIG. 2B).

EXAMPLE 4

A coating solution was prepared by dissolving, as an organic metal compound, 0.01 mol (2.084 g) of palladium malonate in 1000 ml of ethyl malonate. The coating solution was coated on the insulating base plate 1 including the device electrodes 5, 6 formed thereon by using a spinner made by Mikasa Co. Ltd. at 1000 rpm for 30 seconds.

The coated film in this Example also had no crystallinity.

EXAMPLE 5

A coating solution was prepared by dissolving, as an organic metal compound, 0.01 mol (2.249 g) of palladium acetate in 1000 ml of ethyl butylate. The coating solution was coated on the insulating base plate 1 including the device electrodes 5, 6 formed thereon by using a spinner made by Mikasa Co. Ltd. at 1000 rpm for 30 seconds.

As a result of X-ray analysis (XD) of the coated film in this Example, it was confirmed that the diffraction patterns of Pd acetate observed in X-ray analysis (powder XD) was not found and the coated film had no crystallinity.

EXAMPLE 6

A coating solution was prepared by dissolving, as an organic metal compound, 0.01 mol (6.733 g) of palladium stearate in 1000 ml of chloroform. The coating solution was coated on the insulating base plate 1 including the device electrodes 5, 6 formed thereon by using a spinner made by Mikasa Co. Ltd. at 1000 rpm for 30 seconds. As a result of X-ray analysis, the coated film in this Example also had no crystallinity. As with Example 1, a voltage was then applied to between the device electrodes 5, 6 for the Forming treatment. In this Example, the Forming treatment was performed in a vacuum atmosphere of $1\times10^{-6}$ Torr for 60 seconds on condition of setting T1 to 1 ms, T2 to 10 ms, and a crest value of the triangular waveform to 6 V, thereby forming an electron-emitting device. Characteristics of the electron-emitting device was measured by using the measuring/evaluating apparatus shown in FIG. 3 as with Example 1. As a result, at 14 V of the device voltage Vf, the device current If was 2.1 mA and the emission current Ie was 1.3 $\mu$A. Thus, the electron emission efficiency $\eta$=Ie/If (%) was 0.06%.

EXAMPLE 7

A coating solution was prepared by dissolving, as an organic metal compound, 0.01 mol (2.249 g) of palladium acetate and 0.005 mol (0.3 g) of acetic acid in 1000 ml of chloroform. The coating solution was coated on the insulating base plate 1 including the device electrodes 5, 6 formed thereon by using a spinner made by Mikasa Co. Ltd. at 1000 rpm for 30 seconds.

As a result of X-ray analysis, the coated film in this Example also had no crystallinity.

EXAMPLE 8

Figure 13:
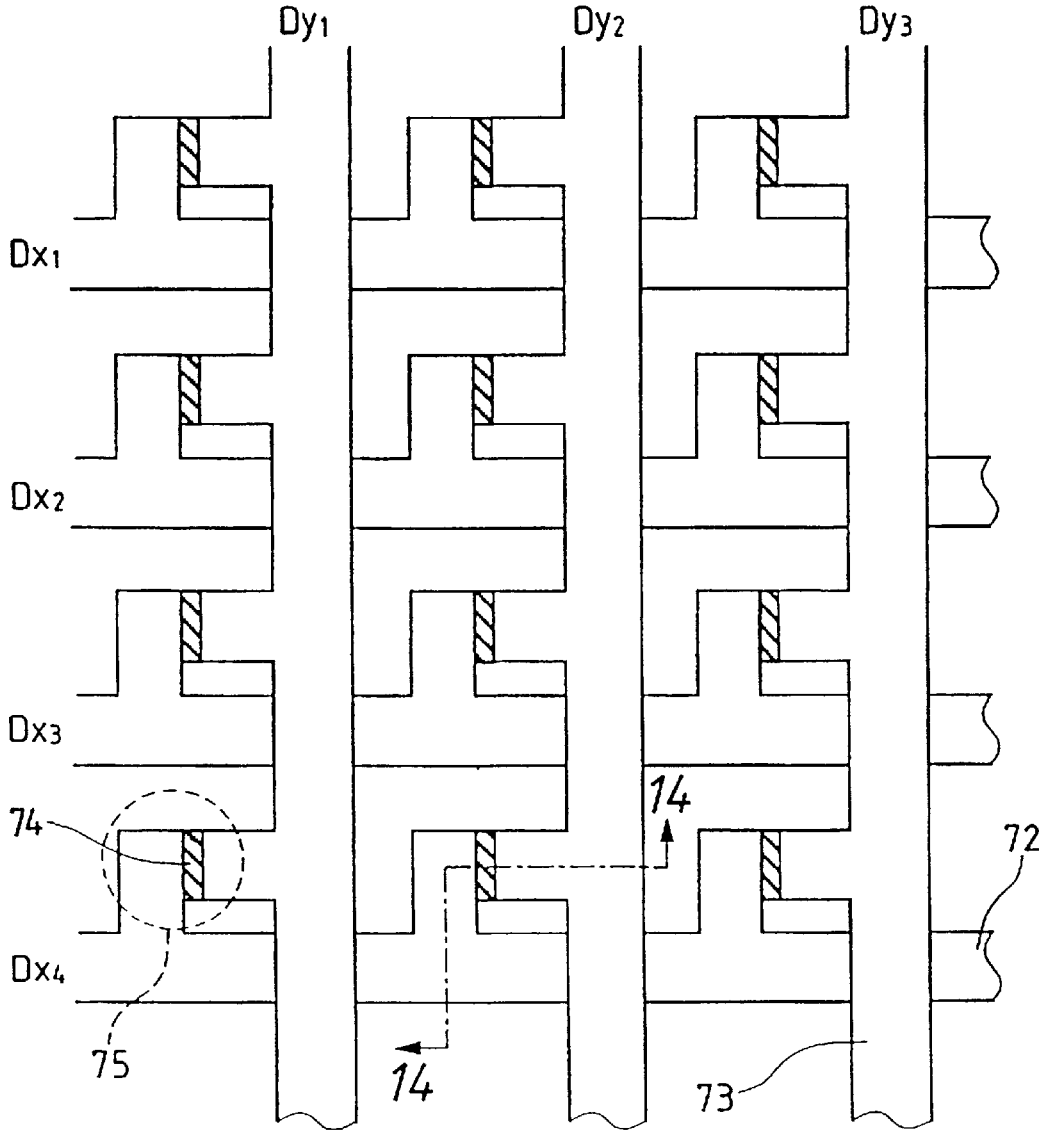
FIG. 13 is a schematic plan view showing part of an electron source of the image-forming apparatus.
Figure 14:
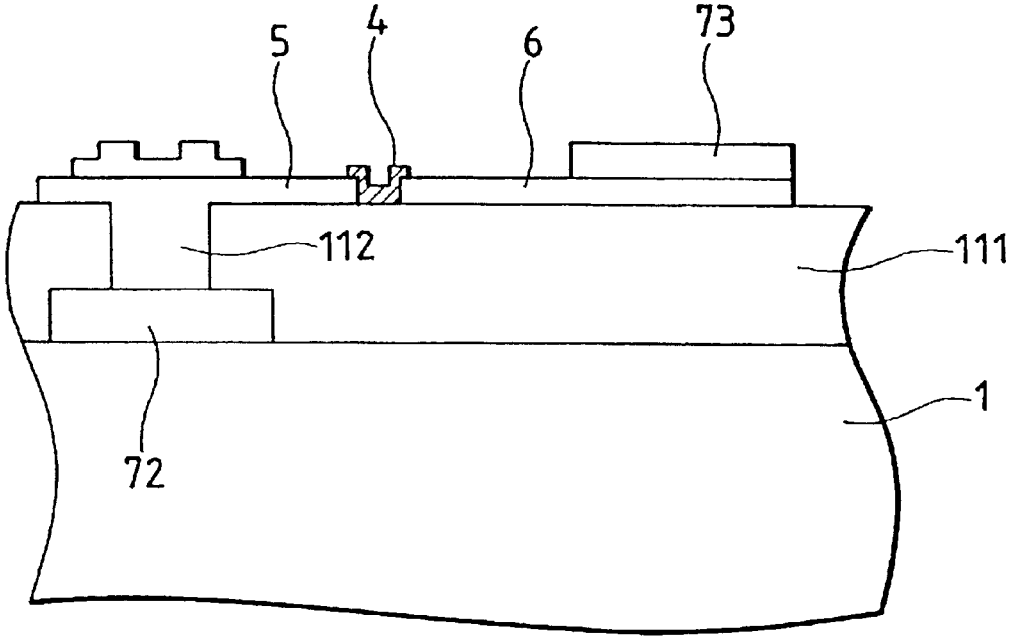
FIG. 14 is a sectional view taken along line 14—14 in FIG. 13.

A plan view of part of an electron source is shown in FIG. 13 and a sectional view taken along line 14—14 in FIG. 13 is shown in FIG. 14. Note that the same reference numerals in FIGS. 13, 14, and 15A to 15H denote identical members. Denoted by 1 is a base plate, 72 is an X-direction wiring (also referred to as a lower wiring) corresponding to Dxm in FIG. 7, 73 is a Y-direction wiring (also referred to as an upper wiring) corresponding to Dyn in FIG. 7, 4 is a thin film including an electron-emitting region, 5 and 6 are device electrodes, 111 is an interlayer insulating layer, and 112 is a contact hole for electrical connection between the device electrode 5 and the lower wiring 72.

The manufacture process will be described below in detail in the order of successive steps with reference to FIGS. 15A to 15H.

Figure 15A:
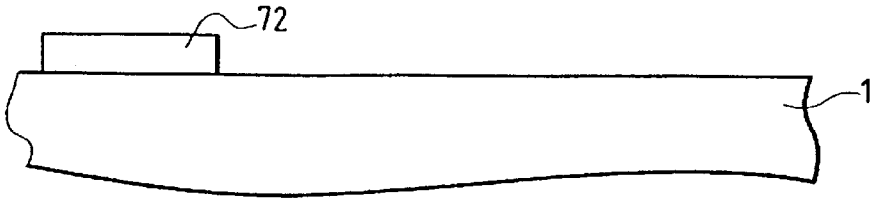
FIGS. 15A, 15B, 15C, 15D, 15E, 15F, 15G and 15H are sectional views showing successive steps for first half of a process of manufacturing the electron source of the image-forming apparatus.

Step-a (FIG. 15A)

A silicon oxide film being 0.5 micron thick was formed on a washed soda lime glass, as the base plate 1, by sputtering. A Cr film being 50 Å thick and an Au film being 6000 Å thick were then laminated on the base plate 1 in this order by vacuum evaporation. A photoresist (AZ1370, by Hoechst Co.) was coated thereon under rotation by using a spinner and then baked. Thereafter, by exposing and developing a photomask image, a resist pattern for the lower wirings 72 was formed. The deposited Au/Cr films were selectively removed by wet etching to thereby form the lower wirings 72 in the desired pattern.

Figure 15B:
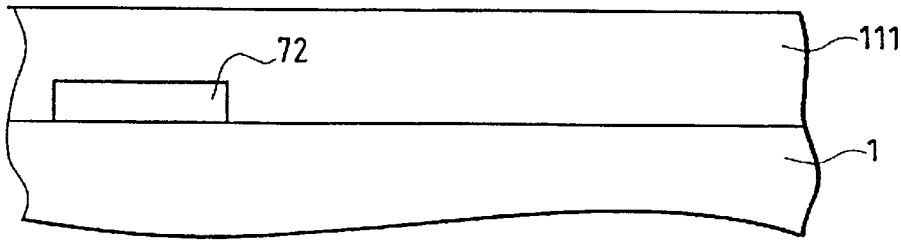

Step-b (FIG. 15B)

Then, the interlayer insulating layer 111 formed of a silicon oxide film being 1.0 micron thick was deposited over the entire base plate by RF sputtering.

Figure 15C:
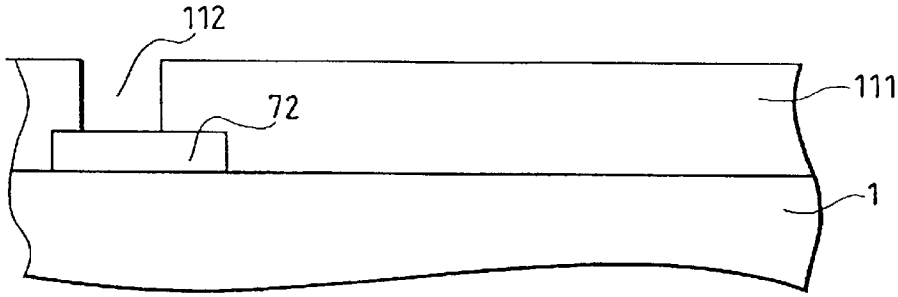

Step-c (FIG. 15C)

A photoresist pattern for forming the contact holes 112 in the silicon oxide film deposited in Step-b was coated and, by using it as a mask, the interlayer insulating layer 111 was selectively etched to form the contact holes 112. The etching was carried out by the RIE (Reactive Ion Etching) process using a gas mixture of $CF_4$ and $H_2$.

Figure 15D:
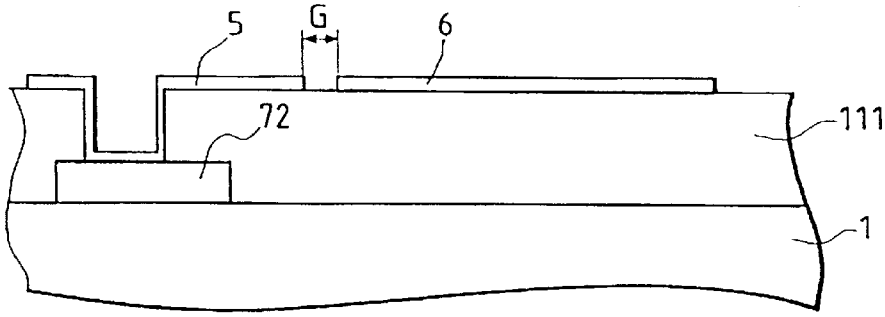

Step-d (FIG. 15D)

A photoresist (RD-2000N-41, by Hitachi Chemical Co., Ltd.) was formed in a pattern to define the device electrodes 5, 6 and the gaps G therebetween. A Ti film being 50 Å thick and an Ni film being 1000 Å thick were then deposited thereon in this order by vacuum evaporation. The photoresist pattern was dissolved by an organic solvent to leave the deposited Ni/Ti films by lift-off. The device electrodes 5, 6 each having the electrode width W1 of 300 microns with the electrode gap G of 3 microns were thereby formed.

Figure 15E:
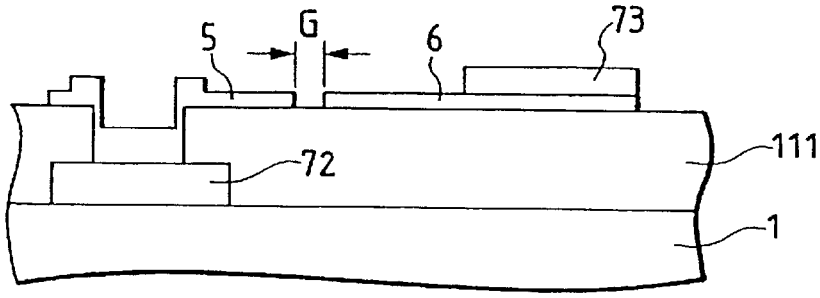

Step-e (FIG. 15E)

A photoresist pattern for the upper wirings 73 was formed on the device electrodes 5 and 6. A Ti film being 50 Å thick and an Au film being 5000 Å thick were then deposited thereon in this order by vacuum evaporation. The unnecessary photoresist pattern was removed to form the upper wirings 73 by lift-off.

Figure 15F:
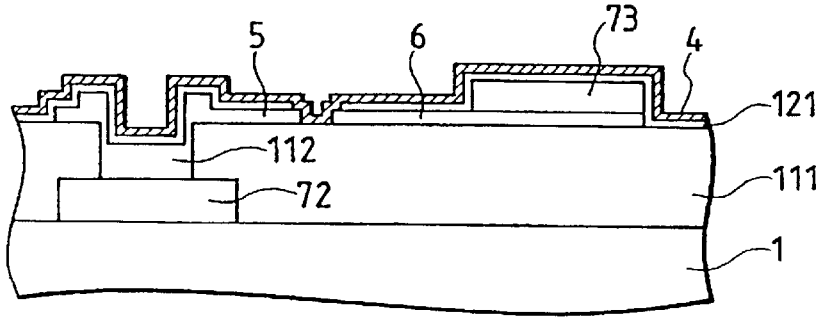

Step-f (FIG. 15F)

Figure 16:
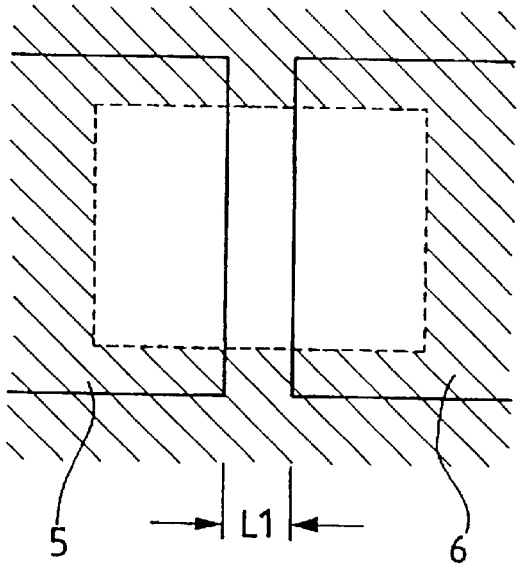
FIG. 16 is a plan view showing part of a mask for an electron-emitting region-forming thin film of the electron-emitting device.
Figure 17:
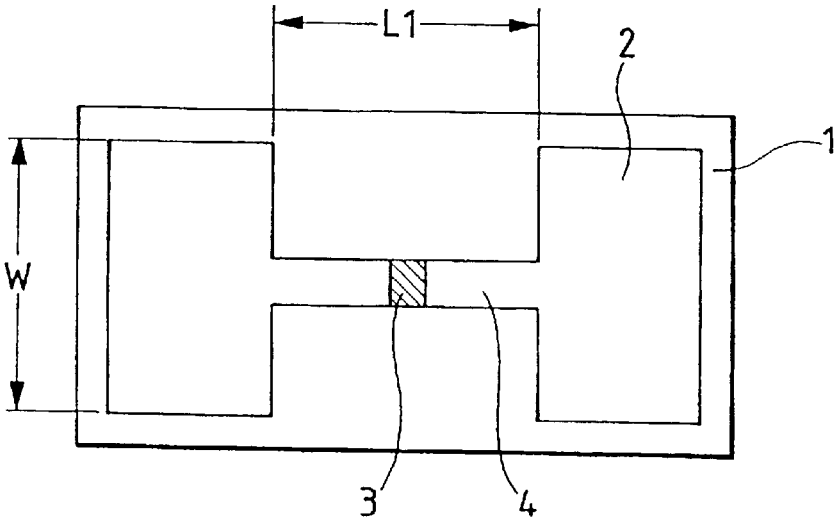
FIG. 17 PRIOR ART
FIG. 17 is an explanatory view showing the structure of a conventional surface conduction electron-emitting device.

FIG. 16 is a plan view showing part of a mask used in this step to form an electron-emitting region-forming thin film 2 of the electron-emitting device. The mask has an opening covering each gap G between the device electrodes and the vicinity thereof. A Cr film 121 being 1000 Å thick was deposited by vacuum evaporation and patterned by using the mask. The organic metal compound (i.e., the butyl acetate solution of Pd acetate) used in Example 1 was coated thereon under rotation by using a spinner and then heated for calcination at 300° C. for 10 minutes. The electron-emitting region-forming thin film 2 thus formed and comprising fine particles of Pd as a primary constituent element had a thickness of 100 angstroms and a sheet resistance value of $5\times10^4$ Ω/□. The term "fine particle film" used herein means, as previously described, a film comprising a number of fine particles aggregated together and having microstructures in which fine particles are not only individually dispersed away from each other, but also adjacent to or overlapped with each other (including the island form). The size of the fine particles means a diameter of those fine particles whose shape can be discerned in any of the above forms.

Figure 15G:
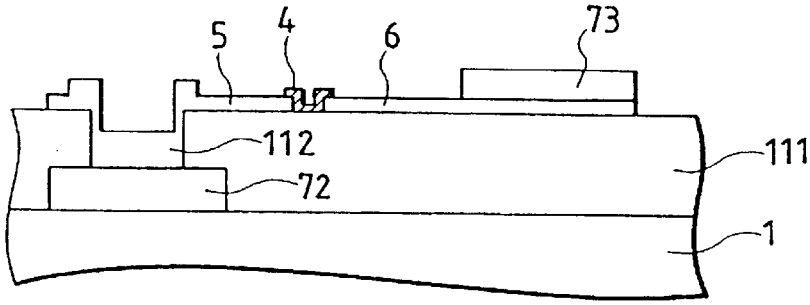

Step-g (FIG. 15G)

The Cr film 121 and the electron-emitting region-forming thin film 4 after the calcination were etched by an acid etchant to be formed into the desired pattern.

Figure 15H:
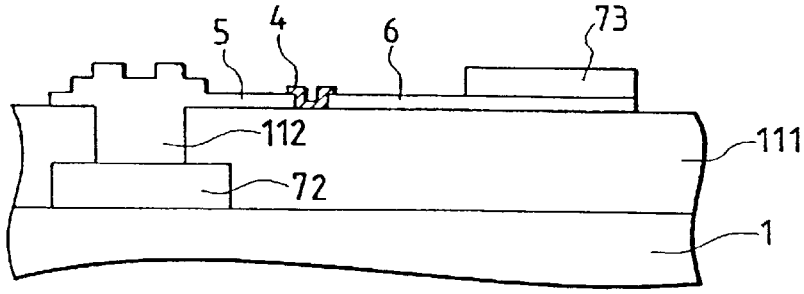

Step-h (FIG. 15H)

A resist was coated in a pattern to cover the surface other than the contact holes 112. A Ti film being 50 Å thick and an Au film being 5000 Å thick were then deposited thereon in this order by vacuum evaporation. The unnecessary resist pattern was removed to make the contact holes 112 filled with the deposits by lift-off.

As a result of the above steps, the lower wirings 72, the interlayer insulating later 111, the upper wirings 73, the device electrodes 5, 6, the electron-emitting region-forming thin films 2, etc. were formed on the insulating base plate 1.

A description will now be made, with reference to FIGS. 8 and 9A, of an example in which a display device is made up by using the electron source manufactured as explained above.

The base plate 1 on which a number of plane type surface conduction electron-emitting devices were manufactured through the foregoing steps was fixed onto a rear plate 81. Then, a face plate 86 (comprising a fluorescent film 84 and a metal back 85 laminated on an inner surface of a glass base plate 83) was disposed 5 mm above the base plate 71 with the intervention of a support frame 82 between and, after applying frit glass to joined portions between the face plate 86, the support frame 82 and the rear plate 81, the assembly was baked in an atmosphere of air or nitrogen gas at 400° C. to 500° C. for 10 minutes or more for hermetically sealing the joined portions (FIG. 8). Frit glass was also used to fix the base plate 71 to the rear plate 81.

In FIG. 8, denoted by 74 is an electron-emitting device and 72, 73 are X- and Y-direction wirings, respectively.

The fluorescent film 84 is formed of only a fluorescent substance in the monochrome case. For producing a color image, this Example employs a stripe pattern of fluorescent substances (FIG. 9A). Thus, the fluorescent film 84 was fabricated by first forming black stripes and then coating fluorescent substances in respective colors in gaps between the black stripes. The black stripes were formed by using a material containing graphite as a primary component which is conventionally employed in the art. Fluorescent substances were coated on the glass base plate 83 by the slurry method.

On the inner surface of the fluorescent film 84, the metal back 85 is usually disposed. After forming the fluorescent film, the metal back 85 was fabricated by smoothing the inner surface of the fluorescent film (this step being usually called filming) and then depositing A1 thereon by vacuum evaporation.

To increase conductivity of the fluorescent film 84, the face plate 86 may be provided with a transparent electrode (not shown) on an outer surface of the fluorescent film 84 in some cases. Such a transparent electrode was omitted in this Example because sufficient conductivity was obtained with the metal back alone.

Before the above hermetic sealing, alignment of the respective parts was carried out with due care since the fluorescent substances in respective colors and the electron-emitting devices must be precisely aligned with each other in the color case.

The atmosphere in the glass envelope thus completed was evacuated by a vacuum pump through an evacuation tube (not shown). After reaching a sufficient degree of vacuum, a voltage was applied to between the device electrodes 5 and 6 of the electron-emitting devices 74 through terminals Dox1 to Doxm and Doy1 to Doyn extending outwardly of the envelope for producing the electron-emitting regions 3 by the energization treatment (Forming treatment) of the electron-emitting region-forming thin films 2. The voltage waveform used for the Forming treatment is shown in FIG. 4A.

Specifically, in FIG. 4A, T1 and T2 represent respectively a pulse width and a pulse interval of the voltage waveform. In this Example, on condition that T1 was set to 1 ms, T2 was set to 10 ms, and a crest value of the triangular waveform (i.e., a peak voltage during the energization Forming) was set to 5 V, the Forming treatment was performed in a vacuum atmosphere of about $1\times10^{-6}$ Torr for 60 seconds.

In the electron-emitting regions 3 thus formed, fine particles of palladium as a primary constituent element were dispersed and the average size of the fine particles was 35 angstroms.

Then, the above-mentioned activation treatment was performed by applying a voltage to between the device electrodes 5 and 6 of the electron-emitting devices 74 after completion of the Forming treatment.

The voltage waveform (not triangular, but rectangular) shown in FIG. 4B was employed for the activation treatment. In this Example, the activation treatment was performed in a vacuum atmosphere of $1\times10^{-5}$ Torr on condition of setting T1 to 1 ms, T2 to 10 ms, and a crest value to 14 V.

After that, the interior of the envelope 88 was further evacuated through the evacuation tube (not shown) to create a vacuum degree of about $10^{-6.5}$ Torr, and the envelope was then hermetically sealed off by heating and fusing the evacuation tube (not shown) by using a gas burner.

Finally, to maintain the vacuum degree after the sealing, the envelope was subjected to gettering. This process was performed by, immediately before sealing off the envelope, heating a getter disposed in a predetermined position (not shown) within the envelope by high-frequency heating or the like to form an evaporation film of the getter. The getter contained Ba or the like as a primary component.

In the image-forming apparatus of the present invention thus completed, a scan signal and a modulation signal were applied from signal generating means (not shown) to desired ones of the electron-emitting devices through the terminals Dox1 to Doxm and Doy1 to Doyn extending outwardly of the envelope, thereby emitting electrons therefrom. Simultaneously, a high voltage of several kilovolts or more was applied to the metal back 85 through the high-voltage terminal Hv so that the electron beams were accelerated to impinge upon the fluorescent film 84. The fluorescent substances were thereby excited to radiate light for display of an image.

In parallel, to grasp characteristics of the plane type surface conduction electron-emitting devices manufactured through the above steps, a reference comparative sample having the same dimensions indicated by L1, W, etc. as those of the plane type surface conduction electron-emitting device shown in FIGS. 1A and 1B was fabricated and its characteristics of electron emission were measured by using the above-explained measuring/evaluating apparatus shown in FIG. 3.

The comparative sample was measured on condition that the distance between the anode electrode and the electron-emitting device was set to 4 mm, the potential of the anode electrode was set to 1 kV, and the vacuum degree in the vacuum apparatus during the measurement of electron emission characteristics was set to $1\times10^{-7}$ Torr.

As a result of applying the device voltage to between the device electrodes 5 and 6 and measuring the device current If and the emission current Ie generated then, current versus voltage characteristics where the current increased monotonously with respect to the voltage as shown in FIG. 5 were obtained.

In the measured comparative device, the emission current Ie was abruptly increased from about 8 V of the device voltage Vf. At 14 V of the device voltage Vf, the device current If was 2.2 mA and the emission current Ie was 1.1 $\mu$A. Thus, the electron emission efficiency $\eta$=Ie/If (%) was 0.05%.

EXAMPLE 9

As an electron-emitting device of this Example, an electron-emitting device of the type shown in FIGS. 1A and 1B was fabricated. FIGS. 1A and 1B are respectively a plan and sectional view of the device. In FIGS. 1A and 1B, denoted by reference numeral 1 is an insulating base plate, 5 and 6 are device electrodes for applying a voltage to the device, 4 is a thin film including an electron-emitting region, and 3 is an electron-emitting region. Additionally, in FIGS.

1A and 1B, L1 represents the spacing between the device electrodes 5 and 6, W1 the width of the device electrodes, d the thickness of the device electrodes, and W2 the width of the device.

The manufacture process of the electron-emitting device of this embodiment will be described below with reference to FIGS. 2A to 2C.

A quartz plate was used as the insulating base plate 1 and, after sufficiently washing it with an organic solvent, the device electrodes 5, 6 made of Ni were formed on the surface of the base plate 1 (FIG. 2A). At this time, the spacing L1 between the device electrodes was set to 3 microns, the width W1 of the device electrodes was set to 500 microns, and the thickness d thereof was set to 1000 angstroms.

A coating solution was prepared by dissolving, as an organic metal compound, 0.1 mol (22.49 g) of palladium acetate in 100 ml of butyl acetate. The coating solution was coated on the insulating base plate 1 including the device electrodes 5, 6 formed thereon by using a spinner made by Mikasa Co. Ltd. at 1000 rpm for 30 seconds, thereby forming a film. The base plate was then heated to 300° C. inside an oven in an atmosphere of air, causing the organic metal compound to be decomposed and deposited on the base plate to form a fine particle film comprising palladium oxide fine particles (average size: 73 angstroms), thereby producing an electron-emitting region-forming thin film 2 (FIG. 2B). It was confirmed by X-ray analysis that the fine particles were made of palladium oxide. The electron-emitting region-forming thin film 2 had a width (corresponding to the device width) W of 300 microns and was positioned almost centrally between the device electrodes 5 and 6. Also, the thickness of the electron-emitting region-forming thin film 2 was 100 angstroms and the sheet resistance value thereof was $5\times10^4$ Ω/□.

Next, the Forming treatment was performed in a like manner to Example 1. In this Example, the Forming treatment was performed in a vacuum atmosphere of about $1\times10^{-6}$ Torr for 60 seconds by setting the voltage waveform (FIG. 4A) for the Forming treatment such that T1 was set to 1 ms, T2 was set to 10 ms, and a crest value of the triangular waveform (i.e., a peak voltage during the energization Forming) was set to 5 V.

In the electron-emitting region 3 thus formed, fine particles of palladium as a primary constituent element were dispersed and the average size of the fine particles was 32 angstroms.

The device fabricated as above was measured for its characteristic of electron emission in a like manner to Example 1. Specifically, the device voltage was applied to between the device electrodes 5 and 6 of the electron-emitting device, and the device current If and the emission current Ie generated then were measured by using the measuring/evaluating apparatus shown in FIG. 3. As a result, current versus voltage characteristics as shown in FIG. 5 were obtained. In the measured device, the emission current Ie was abruptly increased from about 8 V of the device voltage Vf. At 16 V of the device voltage Vf, the device current If was 2.0 mA and the emission current Ie was 1.0 μA. Thus, the electron emission efficiency η=Ie/If (%) was 0.05%.

EXAMPLE 10

In a similar manufacture process of electron-emitting devices as in above Example 9, a coating solution was prepared by dissolving, as an organic metal compound, 0.1 mol (24.88 g) of nickel acetate (4 hydrates) in 100 ml of water. The coating solution was coated on the insulating base plate 1 including the device electrodes 5, 6 formed thereon by using a spinner. The base plate was then heated to 350° C., causing the organic metal compound to be decomposed and deposited on the base plate to form a fine particle film comprising nickel oxide fine particles (average size: 60 angstroms), thereby producing an electron-emitting region-forming thin film 2 (FIG. 2B). It was confirmed by X-ray analysis that the fine particles were made of nickel oxide.

As a result of observing the coated film by X-ray diffraction and an optical microscope, it was found that no crystals were precipitated and the coated film was uniform.

EXAMPLE 11

As an electron-emitting device of this Example, an electron-emitting device of the type shown in FIGS. 1A and 1B was fabricated. FIGS. 1A and 1B are respectively a plan and sectional view of the device. In FIGS. 1A and 1B, denoted by reference numeral 1 is an insulating base plate, 5 and 6 are device electrodes for applying a voltage to the device, 4 is a thin film including an electron-emitting region, and 3 is an electron-emitting region. Additionally, in FIGS. 1A and 1B, L1 represents the spacing between the device electrodes 5 and 6, W1 the width of the device electrodes, d the thickness of the device electrodes, and W2 the width of the device.

The manufacture process of the electron-emitting device of this embodiment will be described below with reference to FIGS. 2A to 2C.

A quartz plate was used as the insulating base plate 1 and, after sufficiently washing it with an organic solvent, the device electrodes 5, 6 made of Ni were formed on the surface of the base plate 1 (FIG. 2A). At this time, the spacing L1 between the device electrodes was set to 3 microns, the width W1 of the device electrodes was set to 500 microns, and the thickness d thereof was set to 1000 angstroms.

A coating solution was prepared by dissolving, as an organic metal compound, 0.1 mol (22.49 g) of palladium acetate and 0.01 mol (600 mg) of acetic acid in 100 ml of butyl acetate. The coating solution was coated on the insulating base plate 1 including the device electrodes 5, 6 formed thereon by using a spinner made by Mikasa Co. Ltd. at 1000 rpm for 30 seconds, thereby forming a film. The base plate was then heated to 300° C. inside an oven in an atmosphere of air, causing the organic metal compound to be decomposed and deposited on the base plate to form a fine particle film comprising palladium oxide fine particles (average size: 78 angstroms), thereby producing an electron-emitting region-forming thin film 2 (FIG. 2B). It was confirmed by X-ray analysis that the fine particles were made of palladium oxide. The electron-emitting region-forming thin film 2 had a width (corresponding to the device width) W of 300 microns and was positioned almost centrally between the device electrodes 5 and 6. Also, the thickness of the electron-emitting region-forming thin film 2 was 100 angstroms and the sheet resistance value thereof was $5\times10^4$ Ω/□.

Next, the Forming treatment was performed in a like manner to Example 1. The voltage waveform used for the Forming treatment is shown in FIG. 4A.

Specifically, in FIG. 4A, T1 and T2 represent respectively a pulse width and a pulse interval of the voltage waveform. In this Example, on condition that T1 was set to 1 ms, T2 was set to 10 ms, and a crest value of the triangular waveform (i.e., a peak voltage during the energization Forming) was set to 5 V, the Forming treatment was performed in a vacuum atmosphere of about $1\times10^{-6}$ Torr for 60 seconds.

In the electron-emitting region 3 thus formed, fine particles of palladium as a primary constituent element were dispersed and the average size of the fine particles was 35 angstroms.

The device fabricated as above was measured for its characteristic of electron emission. Specifically, the device voltage was applied to between the device electrodes 5 and 6 of the electron-emitting device, and the device current If and the emission current Ie generated then were measured by using the measuring/evaluating apparatus shown in FIG. 3. As a result, current versus voltage characteristics as shown in FIG. 5 were obtained. In the measured device, the emission current Ie was abruptly increased from about 8 V of the device voltage Vf. At 16 V of the device voltage Vf, the device current If was 2.2 mA and the emission current Ie was 1.1 $\mu$A. Thus, the electron emission efficiency $\eta$=Ie/If (%) was 0.05%.

In this Example described above, while the Forming treatment was performed by applying pulses in the triangular waveform to between the device electrodes for forming the electron-emitting region, the pulse waveform applied to between the device electrodes is not limited to the triangular waveform but may have any other desired waveform such as rectangular one. The crest value, width and interval of the pulses are also not limited to the above-mentioned values, but may be set to any other desired values so long as the electron-emitting region is satisfactorily formed.

EXAMPLE 12

In a similar manufacture process of electron-emitting devices as in above Example 11, a coating solution was prepared by dissolving, as an organic metal compound, 0.1 mol (24.88 g) of nickel acetate (4 hydrates) and 0.01 mol (740 mg) of propionic acid in 1000 ml of water. The coating solution was coated on the insulating base plate 1 including the device electrodes 5, 6 formed thereon by using a spinner. The base plate was then heated to 350° C., causing the organic metal compound to be decomposed and deposited on the base plate to form a fine particle film comprising nickel oxide fine particles (average size: 68 angstroms), thereby producing an electron-emitting region-forming thin film 2 (FIG. 2B). It was confirmed by X-ray analysis that the fine particles were made of nickel oxide.

EXAMPLE 13

A coating solution was prepared by dissolving, as an organic metal compound, a mixture of palladium trifluoroacetate (10 g) and trifluoroacetic acid (1 g) in 1000 ml of acetone. The coating solution was coated on the insulating base plate 1.

As a result of observing the coated film by an optical microscope and analyzing the coated film by the X-ray diffraction method, it was found that no crystals were precipitated and the coated film was uniform.

EXAMPLE 14

As an electron-emitting device of this Example, an electron-emitting device of the type shown in FIGS. 1A and 1B was fabricated. FIGS. 1A and 1B are respectively a plan and a sectional view of the device. In FIGS. 1A and 1B, denoted by reference numeral 1 is a base plate, 5 and 6 are device electrodes for applying a voltage to the device, 4 is a thin film including an electron-emitting region, and 3 is an electron-emitting region. Additionally, in FIGS. 1A and 1B, L1 represents the spacing between the device electrodes 5 and 6, W1 the width of the device electrodes, d the thickness of the device electrodes, and W2 the width of the device.

The manufacture process of the electron-emitting device of this embodiment will be described below with reference to FIGS. 2A to 2C.

A quartz plate was used as the base plate 1 and, after sufficiently washing it with an organic solvent, the device electrodes 5, 6 made of Ni were formed on the surface of the base plate 1 (FIG. 2A). At this time, the spacing L1 between the device electrodes was set to 3 microns, the width W1 of the device electrodes was set to 500 microns, and the thickness d thereof was set to 1000 angstroms.

A coating solution was prepared by dissolving, as an organic metal compound. 2.11 g of palladium acetate in 97.89 g of butyl acetate so that the metal content was about 1 wt %, and by filtering the solution through a Teflon filter of 0.2 micron. The coating solution was coated on the base plate 1 including the device electrodes 5, 6 formed thereon by using a spinner made by Mikasa Co. Ltd. at 1000 rpm for 30 seconds, thereby forming a film. The base plate was then heated to 300° C. inside an oven in an atmosphere of air, causing the organic metal compound to be decomposed and deposited on the base plate to form a fine particle film comprising palladium oxide fine particles (average size: 74 angstroms), thereby producing an electron-emitting region-forming thin film 2 (FIG. 2B). It was confirmed by X-ray analysis that the fine particles were made of palladium oxide. The electron-emitting region-forming thin film 4 had a width (corresponding to the device width) W of 300 microns and was positioned almost centrally between the device electrodes 5 and 6. Also, the thickness of the electron-emitting region-forming thin film 4 was 100 angstroms and the sheet resistance value thereof was $5\times10^{4}$ Ω/□.

As a result of analyzing the coated film by the X-ray diffraction method, it was found that no crystals were precipitated and the coated film was amorphous and uniform.

Next, the Forming treatment was performed in a like manner to Example 1. The voltage waveform used for the Forming treatment is shown in FIG. 4A.

Specifically, in FIG. 4A, T1 and T2 represent respectively a pulse width and a pulse interval of the voltage waveform. In this Example, on condition that T1 was set to 1 ms, T2 was set to 10 ms, and a crest value of the triangular waveform (i.e., a peak voltage during the energization Forming) was set to 5 V, the Forming treatment was performed in a vacuum atmosphere of about $1\times10^{-6}$ Torr for 60 seconds.

In the electron-emitting region 3 thus formed, fine particles of palladium as a primary constituent element were dispersed and the average size of the fine particles was 32 angstroms.

The device fabricated as above was measured for its characteristic of electron emission in a like manner to Example 1. Specifically, the device voltage was applied to between the device electrodes 5 and 6 of the electron-emitting device, and the device current If and the emission current Ie generated then were measured by using the measuring/evaluating apparatus shown in FIG. 3. As a result, current versus voltage characteristics as shown in FIG. 5 were obtained. In the measured device, the emission current Ie was abruptly increased from about 8 V of the device voltage Vf. At 16 V of the device voltage Vf, the device current If was 2.2 mA and the emission current Ie was 1.1 $\mu$A. Thus, the electron emission efficiency $\eta$=Ie/If (%) was 0.05%.

EXAMPLE 15

In a similar manufacture process of electron-emitting devices as in above Example 14, a coating solution was prepared by dissolving, as an organic metal compound, 0.01 mol (3.289 g) of rhodium trifluoroacetate in 100 ml of ethyl trifluoroacetate. The coating solution was coated on the base plate 1 including the device electrodes 5, 6 formed thereon by using a spinner. The base plate was then heated to 350° C., causing the organic metal compound to be decomposed and deposited on the base plate to form a fine particle film comprising rhodium fine particles (average size: 78 angstroms), thereby producing an electron-emitting region-forming thin film 2 (FIG. 2B).

As a result of analyzing the coated film by the X-ray diffraction method, it was found that no crystals were precipitated and the coated film was amorphous and uniform.

EXAMPLE 16

(Fabrication of electron-emitting device using Pd succinate)

As an electron-emitting device of this Example, an electron-emitting device of the type shown in FIGS. 1A and 1B was fabricated. FIGS. 1A and 1B are respectively a plan and sectional view of the device. In FIGS. 1A and 1B, denoted by reference numeral 1 is an insulating base plate, 5 and 6 are device electrodes for applying a voltage to the device, 4 is a thin film including an electron-emitting region, and 3 is an electron-emitting region. Additionally, in FIGS. 1A and 1B, L1 represents the spacing between the device electrodes 5 and 6, W1 the width of the device electrodes, d the thickness of the device electrodes, and W2 the width of the device.

The manufacture process of the electron-emitting device of this embodiment will be described below with reference to FIGS. 2A to 2C.

A quartz plate was used as the base plate 1 and, after sufficiently washing it with an organic solvent, the device electrodes 5, 6 made of Ni were formed on the surface of the base plate 1 (FIG. 2A). At this time, the spacing L1 between the device electrodes was set to 3 microns, the width W1 of the device electrodes was set to 500 microns, and the thickness d thereof was set to 1000 angstroms.

A coating solution was prepared by dissolving, as an organic metal compound, Pd succinate in acetone so that the metal content was about 0.2 wt %, and by filtering the solution through a Teflon filter of 0.2 micron.

The Pd succinate was obtained by adding a nitric acid to metallic Pd and a succinic acid, and then refluxing the reaction product under heating.

The coating solution was coated on the base plate 1 including the device electrodes 5, 6 formed thereon by using a spinner made by Mikasa Co. Ltd. at 1000 rpm for 30 seconds, thereby forming a film. The base plate was then heated, causing the organic metal compound to be decomposed and deposited on the base plate to form a fine particle film comprising palladium oxide fine particles (average size: 70 angstroms), thereby producing an electron-emitting region-forming thin film 2 (FIG. 2B). It was confirmed by X-ray analysis that the fine particles were made of palladium oxide.

The electron-emitting region-forming thin film 2 had a width (corresponding to the device width) W of 300 microns and was positioned almost centrally between the device electrodes 5 and 6. Also, the thickness of the electron-emitting region-forming thin film 2 was 100 angstroms and the sheet resistance value thereof was about $4\times10^4$ $\Omega/\square$.

The term "fine particle film" used herein means a film comprising a number of fine particles aggregated together, and having microstructures in which fine particles are not only individually dispersed away from each other, but also adjacent to or overlapped with each other (including the island form). The size of the fine particles means a diameter of those fine particles whose shape can be discerned in any of the above forms.

Next, the Forming treatment was performed in a like manner to Example 1. The voltage waveform used for the Forming treatment is shown in FIG. 4A.

Specifically, in FIG. 4A, T1 and T2 represent respectively a pulse width and a pulse interval of the voltage waveform. In this Example, on condition that T1 was set to 1 ms, T2 was set to 10 ms, and a crest value of the triangular waveform (i.e., a peak voltage during the energization Forming) was set to 6 V, the Forming treatment was performed in a vacuum atmosphere of about $1\times10^{-6}$ Torr for 60 seconds.

In the electron-emitting region 3 thus formed, fine particles of palladium as a primary constituent element were dispersed and the average size of the fine particles was 30 angstroms.

The device fabricated as above was measured for its characteristic of electron emission in a like manner to Example 1.

Specifically, the device voltage was applied to between the device electrodes 5 and 6 of the electron-emitting device, and the device current If and the emission current Ie generated then were measured by using the measuring/evaluating apparatus shown in FIG. 3. As a result, current versus voltage characteristics as shown in FIG. 5 were obtained. In the measured device, the emission current Ie was abruptly increased from about 8 V of the device voltage Vf. At 16 V of the device voltage Vf, the device current If was 2.0 mA and the emission current Ie was 1.0 $\mu$A. Thus, the electron emission efficiency $\eta$=Ie/If (%) was 0.05%.

EXAMPLE 17

(Fabrication of electron-emitting device using Pd malonate)

An electron-emitting device was fabricated in a similar manner as in above Example 16 except for using, as an organic metal compound, Pd malonate (the metal content was about 0.2 wt %) instead of Pd succinate.

As with Example 16, the Pd malonate was obtained by adding a nitric acid to metallic Pd and a malonic acid, and then refluxing the reaction product under heating.

As a result of evaluating characteristics of the electron-emitting device thus fabricated, at 16 V of the device voltage Vf, the device current If was 2.1 mA and the emission current Ie was 1.1 $\mu$A. Thus, the electron emission efficiency $\eta$=Ie/If (%) was about 0.05%.

EXAMPLE 18

(Fabrication of electron-emitting device using Pd phthalate)

An electron-emitting device was fabricated in a similar manner as in above Example 16 except for using, as an organic metal compound, Pd phthalate (the metal content was about 0.2 wt %) instead of Pd succinate.

As with Example 16, the Pd phthalate was obtained by adding a nitric acid to metallic Pd and a phthalic acid, and then refluxing the reaction product under heating.

As a result of observing the coated film by an optical microscope and analyzing the coated film by the X-ray diffraction method, it was found that no crystals were precipitated and the coated film was uniform.

EXAMPLE 19

(Fabrication of electron-emitting device using Ni malonate)

An electron-emitting device was fabricated in a similar manner as in above Example 16 except for using, as an organic metal compound, Ni malonate (the metal content was about 0.2 wt %) instead of Pd succinate.

The Ni malonate was compounded from nickel hydroxide and a malonic acid.

As a result of observing the coated film by an optical microscope and analyzing the coated film by the X-ray diffraction method, it was found that no crystals were precipitated and the coated film was uniform.

Advantages

Variations in the sheet resistance value of the electron-emitting region-forming thin films of palladium oxide manufactured in Example 1 were within 5% smaller than 10% in the prior art. Variations in Forming results and electron emission among the devices were also smaller than in the prior art.

With the manufacture method of the present invention, uniform electron-emitting region-forming thin films can be obtained and, when electron-emitting devices are fabricated by using those electron-emitting region-forming thin films, variations in characteristics of the devices are also small. As a result, when image-forming apparatus are fabricated by using those electron-emitting devices, the number of failed products due to unevenness in luminance and/or failures in electron-emitting regions can be reduced.

What is claimed is:

[1. A solution (for fabrication of electron-emitting devices) and for forming electron-emitting regions of electron-emitting devices, wherein said solution contains a metal carboxylate expressed by the following formula (I), and a carboxylic ester;

$$(R(COO)_k)_m M \quad (I)$$

where k=numeral from 1 to 4, m=numeral from 1 to 4, and $R=C_nX_{2n+1-k}$ where X=hydrogen or halogen (total number of hydrogen and halogen atoms is 2n+1), n=integer from 0 to 30, and M=metal.]

[2. A solution according to claim 1, wherein said carboxylic ester has the same carboxylic group as $R(COO)_k$ expressed in said general formula (I).]

[3. A solution according to claim 1, wherein said carboxylic ester has a carboxylic group different in R from $R(COO)_k$ expressed in said general formula (I).]

[4. A solution according to claim 1, wherein the content of said metal carboxylate expressed by said general formula (I) is in the range of 0.1 wt % to 10 wt %.]

[5. A solution according to any of claims 1, 2, 3 and 4 further containing a carboxylic acid.]

[6. A solution according to claim 5, wherein said carboxylic acid has the same carboxylic group as $R(COO)_k$ expressed in said general formula (I).]

[7. A solution according to claim 6, wherein said carboxylic acid has the carboxylic group in 1 to 1/100 equivalent with respect to said metal carboxylate expressed in said general formula (I).]

[8. A solution according to claim 5, wherein said carboxylic acid has a carboxylic group different in R from $R(COO)_k$ expressed in said general formula (I).]

[9. A solution according to claim 8, wherein said carboxylic acid has the carboxylic group in 1 to 1/100 equivalent with respect to said metal carboxylate expressed in said general formula (I).]

10. A manufacture method of electron-emitting devices each provided between electrodes with a conductive film including an electron-emitting region, *said electron-emitting devices being capable of emitting electrons from the electron-emitting region to the outside thereof,* wherein *the method comprises:*

(*a*) a process of [forming] *creating* the conductive film in which the electron-emitting region is to be formed *that* includes a step of coating and calcining a solution which contains *0.1 wt % to 10 wt % of* a metal carboxylate expressed by the following general formula (I), an organic solvent [and/or], *and* water;

$$(R(COO)_k)_m M \quad (I)$$

where k=[numeral from] 1 [to 4], m=*a* numeral from 1 to 4, and $R=C_n[X_{2n+1-k}]\ X_{2n+2-k}$ where X=*a* hydrogen or halogen [(total number of hydrogen and halogen atoms is 2n+1)], n=*an* integer from 0 to 30, and M=*a* metal, *wherein said organic solvent is a carboxylic ester having the same carboxylic group as* $R(COO)_k$ *expressed in the general formula (I), at least 90% of the metal carboxylate being decomposed during the calcining step; and*

(*b*) *a process of forming the electron-emitting region in said created conductive film.*

[11. A manufacture method of electron-emitting devices according to claim 10, wherein said organic solvent is carboxylic ester.]

[12. A manufacture method of electron-emitting devices according to claim 11, wherein said carboxylic ester has the same carboxylic group as $R(COO)_k$ expressed in said general formula (I).]

[13. A manufacture method of electron-emitting devices according to claim 11, wherein said carboxylic ester has a carboxylic group different in R from $R(COO)_k$ expressed in said general formula (I).]

[14. A manufacture method of electron-emitting devices according to claim 10, wherein said organic solvent is hydrocarbon halide.]

[15. A manufacture method of electron-emitting devices according to claim 10, wherein the content of said metal carboxylate expressed by said general formula (I) is in the range of 0.1 wt % to 10 wt %.]

16. A manufacture method of electron-emitting devices according to claim 10, *wherein the solution used in process* (*a*) further [containing] *contains* a carboxylic acid.

17. A manufacture method of electron-emitting devices according to claim 16, wherein said carboxylic acid has the same carboxylic group as $R(COO)_k$ expressed in said general formula (I).

18. A manufacture method of electron-emitting devices according to claim 17, wherein said carboxylic acid has the carboxylic group in 1 to 1/100 equivalent with respect to said metal carboxylate expressed in said general formula (I).

19. A manufacture method of electron-emitting devices according to claim 16, wherein said carboxylic acid has a carboxylic group different in R from $R(COO)_k$ expressed in said general formula (I).

20. A manufacture method of electron-emitting devices according to claim 19, wherein said carboxylic acid has the carboxylic group in 1 to 1/100 equivalent with respect to said metal carboxylate expressed in said general formula (I).

21. A manufacture method of electron-emitting devices according to any *one* of claims 10 [to] *or 16*–20, [further including a step of applying a voltage to the conductive film formed by said film forming step] *wherein said process of*

*forming the electron-emitting region includes a step of applying a voltage to the conductive film created by said film-creating process.*

22. A manufacture method of an electron source comprising a plurality of electron-emitting devices, wherein said electron-emitting devices are produced by the manufacture method according to claim 10.

23. A manufacture method of an image-forming apparatus comprising electron-emitting devices and an image-forming member, wherein said electron-emitting devices are produced by the manufacture method according to claim 10.

*24. A manufacture method of electron-emitting devices each provided between electrodes with a conductive film including an electron-emitting region, said electron-emitting devices being capable of emitting electrons from the electron-emitting region to the outside thereof, wherein the method comprises:*

(*a*) *a process of creating the conductive film in which the electron-emitting region is to be formed that includes a step of coating and calcining a solution which contains 0.1 wt % to 10 wt % of a metal carboxylate expressed by the following general formula (I), an organic solvent, and water:*

$$(R(COO)_k)_m M \qquad (I)$$

*where k=2, 3, or 4, m=a numeral from 1 to 4, and* $R=C_nX_{2n+2-k}$ *or* $C_6H_4$ *where X=hydrogen or halogen, n=an integer from 0 to 30, and M=a metal, provided that when n=0, k=2, and when* $R=C_6H_4$*, k=2, and wherein said organic solvent is a carboxylic ester having the same carboxylic group as* $R(COO)_k$ *expressed in the general formula (I), at least 90% of the metal carboxylate being decomposed during the calcining step; and*

(*b*) *a process of forming the electron-emitting region, in said created conductive film.*

* * * * *

UNITED STATES PATENT AND TRADEMARK OFFICE

CERTIFICATE OF CORRECTION

PATENT NO. : RE 37,896 E
DATED : October 29, 2002
INVENTOR(S) : Tomida et al.

It is certified that error appears in the above-identified patent and that said Letters Patent is hereby corrected as shown below:

Column 8,
Line 11, "$RuO_2$" should read -- Ru --.

Column 10,
Line 44, "has" should read -- has been --.

Column 12,
Line 64, "depends" should read -- depend --.

Column 17,
Line 35, "resulted" should read -- resulting --.
Line 54, "regards" should read -- regard --.

Column 19,
Line 13, "may" should read -- may be --.
Line 21, "referred" should read -- referred to --.

Column 23,
Line 16, "was" should read -- were --.

Column 25,
Line 28, "A1" should read -- Al -- (aluminum).

Signed and Sealed this

Thirtieth Day of September, 2003

JAMES E. ROGAN
*Director of the United States Patent and Trademark Office*